(12) United States Patent
Kim et al.

(10) Patent No.: US 11,868,958 B2
(45) Date of Patent: Jan. 9, 2024

(54) SYSTEMS AND METHODS FOR OPTIMIZATION OF PICK WALKS

(71) Applicant: Walmart Apollo, LLC, Bentonville, AR (US)

(72) Inventors: Seon Ki Kim, Dublin, CA (US); Aditya Arcot Srinivasan, Sunnyvale, CA (US); Mingang Fu, Palo Alto, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 405 days.

(21) Appl. No.: 16/778,393

(22) Filed: Jan. 31, 2020

(65) Prior Publication Data

US 2021/0241209 A1    Aug. 5, 2021

(51) Int. Cl.
*G06F 7/00* (2006.01)
*G06Q 30/00* (2023.01)
(Continued)

(52) U.S. Cl.
CPC ......... *G06Q 10/087* (2013.01); *G06F 16/901* (2019.01); *G06F 16/9035* (2019.01); *G06F 16/9038* (2019.01); *G06Q 10/047* (2013.01)

(58) Field of Classification Search
CPC .. G06Q 10/087; G06Q 10/047; G06F 16/901; G06F 16/9038; G06F 16/9035
See application file for complete search history.

(56) References Cited

U.S. PATENT DOCUMENTS 5,909,023 A   6/1999 Ono
6,123,259 A   9/2000 Ogasawara
(Continued)

FOREIGN PATENT DOCUMENTS

CN    101778045 A    7/2010
CN    101964799 A    2/2011
(Continued)

OTHER PUBLICATIONS

ISR for corresponding Int'l Application No. PCT/CN2016/072791, dated Apr. 28, 2016 Apr. 4, 2016.
(Continued)

*Primary Examiner* — Talia F Crawley
(74) *Attorney, Agent, or Firm* — BRYAN CAVE LEIGHTON PAISNER LLP

(57) ABSTRACT

Systems and methods including one or more processors and one or more non-transitory storage devices storing computing instructions configured to run on the one or more processors and perform: receiving a respective number of totes for each respective order of one or more orders; determining, using a first set of rules, when the respective number of totes for a respective order of the one or more orders can be reduced; when the respective number of totes is determined to be able to be reduced, reducing, using a second set of rules, the respective number of totes for the respective order to a respective reduced number of totes for the respective order of the one or more orders; comparing the respective number of totes for the respective order to the respective reduced number of totes for the respective order; and when the respective number of totes for the respective order is compared to be equal to the respective reduced number of totes for the respective order, facilitating displaying, on an electronic device to a picker, the respective number of totes for the respective order. Other embodiments are disclosed herein.

20 Claims, 13 Drawing Sheets

(51) Int. Cl.
*G06G 7/48* (2006.01)
*G06Q 10/087* (2023.01)
*G06Q 10/047* (2023.01)
*G06F 16/9038* (2019.01)
*G06F 16/9035* (2019.01)
*G06F 16/901* (2019.01)

(56) References Cited

U.S. PATENT DOCUMENTS

| | | |
|---|---|---|
| 6,246,998 B1 | 6/2001 | Matsumori |
| 6,266,649 B1 | 7/2001 | Linden |
| 6,317,722 B1 | 11/2001 | Jacobi et al. |
| 6,484,161 B1 | 11/2002 | Chipalkatti |
| 6,876,958 B1* | 4/2005 | Chowdhury .......... G06Q 10/04 703/2 |
| 7,046,685 B1 | 5/2006 | Matsuoka |
| 7,147,154 B2 | 12/2006 | Myers et al. |
| 7,295,990 B1 | 11/2007 | Braumoeller et al. |
| 7,747,543 B1 | 6/2010 | Braumoeller et al. |
| 7,932,831 B2 | 4/2011 | Malik |
| 7,949,686 B2 | 5/2011 | Chang et al. |
| 8,005,761 B1 | 8/2011 | Braumoeller et al. |
| 8,121,876 B1 | 2/2012 | Braumoeller et al. |
| 8,201,737 B1 | 6/2012 | Palacios Durazo et al. |
| 8,401,914 B1 | 3/2013 | Kim |
| 8,428,988 B1 | 4/2013 | Braumoeller et al. |
| 8,452,797 B1 | 5/2013 | Paleja et al. |
| 8,560,461 B1* | 10/2013 | Tian .................. G06Q 10/087 705/332 |
| 8,571,702 B1* | 10/2013 | Haake ................. G06Q 10/047 705/26.1 |
| 8,688,598 B1 | 4/2014 | Shakes et al. |
| 8,732,028 B2 | 5/2014 | Napper |
| 8,818,836 B1 | 8/2014 | Braumoeller et al. |
| 9,015,069 B2 | 4/2015 | Brantley |
| 9,147,208 B1 | 9/2015 | Argue et al. |
| 9,309,056 B2* | 4/2016 | Lafontaine ............ B65G 47/54 |
| 9,466,045 B1 | 10/2016 | Kumar |
| 9,470,532 B2 | 10/2016 | Pellow et al. |
| 9,569,745 B1 | 2/2017 | Ananthanarayanan |
| 9,626,709 B2 | 4/2017 | Koch et al. |
| 9,773,097 B2 | 9/2017 | Mu |
| 10,099,864 B1* | 10/2018 | Gopalakrishnan ........ B07C 5/00 |
| 10,127,514 B2 | 11/2018 | Napoli |
| 10,336,540 B2 | 7/2019 | Gravelle |
| 10,445,807 B1 | 10/2019 | Commons et al. |
| 10,460,332 B1 | 10/2019 | Kujat et al. |
| 10,572,932 B2 | 2/2020 | Kumar |
| 10,657,580 B2 | 5/2020 | Kumar |
| 10,699,328 B2 | 6/2020 | Rajkhowa et al. |
| 10,740,862 B1* | 8/2020 | Cui ....................... G06Q 50/28 |
| 10,943,356 B2 | 3/2021 | Armstrong et al. |
| 2002/0143655 A1 | 10/2002 | Elston |
| 2002/0161664 A1 | 10/2002 | Shaya et al. |
| 2002/0174038 A1 | 11/2002 | Chien |
| 2002/0198756 A1 | 12/2002 | Ghaisas et al. |
| 2003/0033177 A1 | 2/2003 | MacGonigle et al. |
| 2003/0046169 A1 | 3/2003 | Fraser et al. |
| 2003/0177072 A1 | 9/2003 | Bared |
| 2003/0204431 A1 | 10/2003 | Ingman |
| 2004/0010437 A1 | 1/2004 | Kiran et al. |
| 2004/0068443 A1 | 4/2004 | Hopson et al. |
| 2004/0210621 A1* | 10/2004 | Antonellis .......... G06Q 10/087 709/200 |
| 2005/0278062 A1 | 12/2005 | Janert et al. |
| 2006/0020366 A1 | 1/2006 | Bloom |
| 2007/0005377 A1 | 1/2007 | Cherry |
| 2007/0043468 A1 | 2/2007 | Schaefer et al. |
| 2007/0094067 A1 | 4/2007 | Kumar |
| 2007/0174144 A1 | 7/2007 | Borders et al. |
| 2007/0244758 A1 | 10/2007 | Xie |
| 2007/0250355 A1 | 10/2007 | Leet et al. |
| 2009/0048878 A1 | 2/2009 | Metcalf |
| 2009/0157472 A1 | 6/2009 | Burazin et al. |
| 2009/0254398 A1* | 10/2009 | Smith ................... G06Q 10/087 705/28 |
| 2009/0257081 A1 | 10/2009 | Bouchard |
| 2009/0281921 A1 | 11/2009 | Foster et al. |
| 2010/0010902 A1 | 1/2010 | Casey |
| 2010/0194560 A1 | 8/2010 | Hojecki et al. |
| 2010/0287025 A1 | 11/2010 | Fletcher et al. |
| 2011/0213651 A1 | 9/2011 | Milana |
| 2012/0023034 A1 | 1/2012 | Lynch et al. |
| 2012/0078747 A1 | 3/2012 | Chakrabarti |
| 2012/0123674 A1 | 5/2012 | Perks et al. |
| 2012/0150340 A1 | 6/2012 | Suess et al. |
| 2012/0173449 A1 | 7/2012 | Waddington |
| 2012/0278672 A1 | 11/2012 | Sinanoglu |
| 2012/0330458 A1 | 12/2012 | Weiss |
| 2013/0030955 A1 | 1/2013 | David |
| 2013/0035978 A1 | 2/2013 | Richardson et al. |
| 2013/0185198 A1 | 7/2013 | Lorch |
| 2013/0231990 A1 | 9/2013 | Munjal et al. |
| 2013/0332273 A1 | 12/2013 | Gu et al. |
| 2013/0339966 A1 | 12/2013 | Meng et al. |
| 2013/0346204 A1 | 12/2013 | Wissner-Gross et al. |
| 2014/0003727 A1 | 1/2014 | Lortz et al. |
| 2014/0040075 A1 | 2/2014 | Perry et al. |
| 2014/0046733 A1 | 2/2014 | Grichnik et al. |
| 2014/0095350 A1 | 4/2014 | Carr |
| 2014/0136255 A1 | 5/2014 | Grabovski et al. |
| 2014/0156553 A1 | 6/2014 | Leach et al. |
| 2014/0207615 A1 | 7/2014 | Li et al. |
| 2014/0222623 A1 | 8/2014 | Napper |
| 2014/0266616 A1 | 9/2014 | Jones et al. |
| 2014/0278627 A1 | 9/2014 | Grabovski et al. |
| 2014/0278635 A1 | 9/2014 | Fulton et al. |
| 2014/0279294 A1* | 9/2014 | Field-Darragh ... G06Q 30/0282 705/28 |
| 2014/0288696 A1* | 9/2014 | Lert ..................... B65G 1/1373 700/216 |
| 2014/0324491 A1* | 10/2014 | Banks ................. G06Q 10/087 705/7.12 |
| 2014/0336814 A1* | 11/2014 | Moore ............... G06Q 10/0875 700/216 |
| 2014/0351101 A1* | 11/2014 | Danelski ................ G06Q 30/06 705/28 |
| 2014/0379529 A1 | 12/2014 | Agasti et al. |
| 2014/0379829 A1 | 12/2014 | Mahdi |
| 2015/0051994 A1 | 2/2015 | Ward et al. |
| 2015/0081088 A1 | 3/2015 | Lyon et al. |
| 2015/0120514 A1 | 4/2015 | Deshpande et al. |
| 2015/0170256 A1 | 6/2015 | Pettyjohn |
| 2015/0186803 A1 | 7/2015 | Stong |
| 2015/0187027 A1 | 7/2015 | Lowe |
| 2015/0206093 A1 | 7/2015 | Trew et al. |
| 2015/0242918 A1 | 8/2015 | McCarthy |
| 2015/0278759 A1 | 10/2015 | Harris et al. |
| 2015/0307278 A1 | 10/2015 | Wickham et al. |
| 2015/0310447 A1 | 10/2015 | Shaw |
| 2015/0363843 A1 | 12/2015 | Loppatto et al. |
| 2015/0370251 A1 | 12/2015 | Siegel et al. |
| 2016/0012391 A1 | 1/2016 | Burnett |
| 2016/0055222 A1 | 2/2016 | Sarferaz |
| 2016/0055452 A1 | 2/2016 | Qin |
| 2016/0063604 A1 | 3/2016 | Shaffer et al. |
| 2016/0071056 A1 | 3/2016 | Ellison et al. |
| 2016/0092969 A1 | 3/2016 | Gopalsamy et al. |
| 2016/0148300 A1 | 5/2016 | Carr et al. |
| 2016/0155088 A1 | 6/2016 | Pylappan |
| 2016/0171592 A1 | 6/2016 | Pugh et al. |
| 2016/0203543 A1 | 7/2016 | Snow |
| 2016/0217513 A1 | 7/2016 | Moghaddam et al. |
| 2016/0223339 A1 | 8/2016 | Pellow et al. |
| 2016/0247113 A1 | 8/2016 | Rademaker |
| 2016/0253740 A1 | 9/2016 | Goulart |
| 2016/0258762 A1 | 9/2016 | Taylor et al. |
| 2016/0260158 A1 | 9/2016 | High et al. |
| 2016/0299782 A1 | 10/2016 | Jones et al. |
| 2016/0314335 A1* | 10/2016 | Al-Kofahi ............... G06T 7/187 |
| 2016/0314429 A1 | 10/2016 | Gillen et al. |
| 2016/0321605 A1 | 11/2016 | Maifeld et al. |
| 2016/0328781 A1 | 11/2016 | Patel-Zellinger et al. |

(56) References Cited

U.S. PATENT DOCUMENTS

| | | | |
|---|---|---|---|
| 2016/0350837 A1 | 12/2016 | Williams et al. | |
| 2017/0011338 A1 | 1/2017 | Stenneth | |
| 2017/0011449 A1 | 1/2017 | Mueller et al. | |
| 2017/0018041 A1 | 1/2017 | Fox | |
| 2017/0024789 A1 | 1/2017 | Frehn et al. | |
| 2017/0024805 A1 | 1/2017 | Tepfenhart | |
| 2017/0069013 A1 | 3/2017 | Castillo | |
| 2017/0124511 A1 | 5/2017 | Mueller et al. | |
| 2017/0200108 A1 | 7/2017 | Au et al. | |
| 2017/0213186 A1* | 7/2017 | Grifoni | G06Q 10/087 |
| 2017/0228701 A1 | 8/2017 | Wosk et al. | |
| 2017/0278047 A1 | 9/2017 | Welty et al. | |
| 2017/0278176 A1* | 9/2017 | Valkov | B65B 57/00 |
| 2017/0285648 A1 | 10/2017 | Welty et al. | |
| 2017/0369245 A1* | 12/2017 | Suemitsu | B65G 1/137 |
| 2017/0372226 A1 | 12/2017 | Costa | |
| 2018/0075404 A1 | 3/2018 | Hendrickson | |
| 2018/0096295 A1 | 4/2018 | Wang et al. | |
| 2018/0121992 A1 | 5/2018 | Agarwal et al. | |
| 2018/0137452 A1 | 5/2018 | Khartravath et al. | |
| 2018/0182054 A1 | 6/2018 | Yao et al. | |
| 2018/0218311 A1 | 7/2018 | Kumar | |
| 2018/0218440 A1* | 8/2018 | Kumar | G06Q 30/0635 |
| 2018/0247257 A1* | 8/2018 | Lert, Jr. | H04W 4/35 |
| 2018/0253805 A1 | 9/2018 | Kelly et al. | |
| 2018/0260744 A1 | 9/2018 | Fukuda et al. | |
| 2018/0275525 A1 | 9/2018 | Bow et al. | |
| 2018/0300800 A1 | 10/2018 | Rajkhowa et al. | |
| 2018/0307998 A1 | 10/2018 | Strachan | |
| 2018/0314991 A1 | 11/2018 | Grundberg | |
| 2018/0342031 A1* | 11/2018 | Tada | G06T 7/292 |
| 2018/0349861 A1 | 12/2018 | Goja | |
| 2018/0374046 A1* | 12/2018 | Powers | G06Q 10/08345 |
| 2019/0019240 A1 | 1/2019 | Smith | |
| 2019/0057347 A1 | 2/2019 | Vitek et al. | |
| 2019/0197195 A1 | 6/2019 | Krishnamurthy et al. | |
| 2019/0325377 A1* | 10/2019 | Rajkhowa | G06Q 10/04 |
| 2019/0340561 A1 | 11/2019 | Rajkhowa et al. | |
| 2020/0311644 A1* | 10/2020 | Willard, III | G06Q 30/0601 |
| 2021/0061566 A1* | 3/2021 | Cacioppo | B25J 9/162 |
| 2021/0269244 A1* | 9/2021 | Ahmann | B65G 1/0492 |

FOREIGN PATENT DOCUMENTS

| | | |
|---|---|---|
| CN | 102137100 A | 7/2011 |
| CN | 102377629 A | 3/2012 |
| DE | 102012100354 | 7/2013 |
| ES | 2309792 T3 | 12/2008 |
| GB | 2524952 | 10/2015 |
| KR | 20160068403 A | 6/2016 |
| WO | 2015120506 | 8/2015 |
| WO | 2016119747 A1 | 8/2016 |
| WO | 2016119749 | 8/2016 |

OTHER PUBLICATIONS

Ertekin, S., & Pelton, L.E. (2015). Navigating the Retail Environment: An Exploratory Investigation of In-Store Mapping Applications. Academy of Marketing Studies Journal, 19(2), 37-48. Retrieved from https://search.proquest.com/docview/1750421168?accountid=14753 2015.

Sharma et al., A Proposed Hybrid Storage Assignment Framework: A Case Study, International Journal of Productivity and Performance Management 65.6:870-892. Emerald Group Publishing Limited. Dialog #2115757331 20 pgs. (Year: 2015) 2015.

Matusiak, Marek et al, "Data-Driven warehouse optimization: deploying skills of order pickers", Finnish Centre of Excellence in Generic Intelligent Machines Research Jun. 29, 2015.

Fulton, Rick, Estimating Delivery Times: A Case Study in Practical Machine Learning, Postmates Blog, Oct. 23, 2015 Oct. 23, 2015.

Pingulkar et al., "Picking productivity estimation in distribution warehouses," Feb. 25, 2015 Feb. 25, 2015.

Mao et al., "Small boxes big data—deep learning approach to optimize variable sized bin packing," IEEE 3rd Conf Big Data Service, pp. 80-89, https://eeexplore.ieee.org/abstract/document/7944923 (Year: 2017) Apr. 6, 2017.

Elmahi, I., et al. "A genetic algorithm approach for the batches delivery optimization in a supply chain." IEEE International Conference on Networking, Sensing and Control, 2004. vol. 1. IEEE, 2004. (Year: 2004).

A. Ulbrich, S. Galka, and W.A. Gunther, "Secure Planning of Order Picking Systems with the Aid of Simulation," 2010 43rd Hawaii International Conference on System Sciences, Honolulu, HI, 2010, pp. 1-7, doi: 10.1109/HICSS.2010.326. (Year: 2010) 2010.

Y. Wang, Z. Wang, and S. Mi, "An Order Batching Clustering Algorithm of Fixed Maximum Order Number Based on Order Picking System," 2017 4th International Conference on Industrial Economics System and Industrial Security Engineering (IEIS), Kyoto, 2017, pp. 106, doi: 10.1109/IEIS.2017.8078640. (Year: 2017) 2017.

J.P. Gagliani, J. Renaud, and A. Ruiz, "A Simulation Model to Improve Warehouse Operations," 2007 Winter Simulation Conference, Washington, DC, 2007, pp. 2012-2018, doi: 10.1109/WSC.2007.4419831. (Year: 2007) 2007.

G. Pedrielli, A. Vinsensius, E.P. Chew, L.H. Lee, A. Duri, and Haobin Li, "Hybrid order picking strategies for fashion E-commerce warehouse systems," 2016 Winter Simulation Conference (WSC), Washington, DC, 2016, pp. 2250-2261, doi: 10.1109/WSC.2016.7822266. (Year: 2016) 2016.

J. Shiau and H. Ma, "An order picking heuristic algorithm for economical packing," Proceedings of the 11th IEEE Interntional Conference on Networking, Sensing and Control, Miami, FL, 2014, pp. 423-437, doi: 10.1109/CNSC.2014.6819665 (Year: 2014) 2014.

M. Bustillo, B. Menendez, E.G. Pardo, and A. Duarte, "An algorithm for batching, sequencing and picking operations in a warehouse," 2015 International Conference on Industrial Engineering and Systems Management (IESM), Seville, 2015, pp. 842-849, doi: 10.1109/IESM.2015.7380254. (Year: 2015) 2015.

Grosse, et al., "The effect of worker learning on manual order picking processes," (2015) (vol. 170, Part C, Dec. 2015, pp. 882-890) 2015.

* cited by examiner a. Calculate min number of totes based on all items' volume and weight and flags for weight and volume check
b. Set MinNumTotes = value in (a)
c. if (MinNumTotes >= size of totes from previous tote reduction area, currentTotes)
    i. ReturnTote = currentTotes
    j. Stop. exit.
d. currentMinNumTotesSize = MinNumTotes
e. Execute the following loop
While(currentMinNumTotesSize <= currentTotes.size -1) {
    i. Create infeasible totes, where the size of totes = currentMinNumTotesSize
        1) Create totes until no more items can be added
        2) Calculate infeasible weight/volume ratio for all totes created while trying to achieve harvest or largest item
        3) Add the heaviest or largest item into the tote with the least infeasible ratio
        4) Repeat (2) and (3) until all items are placed into totes
    ii. Execute Item Exhaustive Search (IES) based on the infeasible ratio
        1) Pick up two items from two different totes
        2) Calculate the infeasible ratio for four totes, existing two totes and possible two totes that might be created by this item swap
            a) Infeasible Ratio = unusedRatioInWeight + overusedRatioInWeight + unusedRatioInVolume + overusedRatioInVolume
        3) Calculate Saving in Infeasible Ratio from this Swap
            a) Sum(Current Two Totes) - Sum(Possible Two Totes)
            b) Note that positive is when saving happens.
        4) Filter swaps with positive saving and sort by the swaps in the decreasing order of the saving
        5) If no positive swap exists, return the last totes
        6) If any positive swap exists, make the swap while considering a tote can't have more than one swap
        7) Check if the new totes violate weight and volume. If all violations disappear, return last totes.
        8) Otherwise, go to step (1) and repeat the whole process.
    iii. Check if the new totes are feasible. If so, ReturnTote = new totes and break the loop.
    iv. currentMinNumTotesSize += 1
}
Return ReturnTote

FIG. 6

```
RandomisedGreedyIncrementalBatcher:

S = Create initial solution which assigns one tote to every picklist; S = List of picklists
Sort S in increasing order of cost finalSolution = List of picklists; initialized as empty
currentSolution = S[0]
remainingPicklists = S[1:]

repeat:
    potentialMerges = calculateSavingsBetween(currentSolution, remainingPicklists)
    if potentialMerges is non empty:
        bestMerge = select merged picklist with highest savings
        update currentSolution with bestMerge
        remove mergedPicklist from remainingPicklists
    else:
        append currentSolution to finalSolution
        currentSolution = remainingPicklists[0]
        remainingPicklists = remainingPicklists[1:]
until:
    remainingPicklists is empty return finalSolution if toteExhaustiveLocalSearch flag is on:
    perform ToteExhaustiveLS if itemExhaustiveLocalSearch flag is on:
    perform itemExhaustiveLS if customLocalSearch flag is on:
    perform customLocalSearch
```

FIG. 8

```
RandomisedToteLocalSearch:

for it = 0 to maxIterations do
    pick two picklists:
        first picklist by roulette wheel selection weighted by average tote cost per picklist,
        (worst picklist gets highest probability)
        second picklist by random
        pick one toteIndex in the range(0, maxNumTotes (8)) for each picklist if both toteIndices are valid:
        perform two way swap if either toteIndex is valid:
        perform one way swap else:
        continue if picklist constraints of swapped picklists is not met:
        continue if savings <= minSavings (0):
        continue else:
        update finalSolution with new picklist
```

FIG. 9

```
UpdateMinTrolley:

set minPicklist = picklist with least number of totes
set minNumTotes = number of totes in minPicklist if minNumTotes < maxNumTote (8)
        set remainingTotes = All totes except totes in minPicklist
        Find best totes from all remainingTotes to combine with minTrolley:
                Call AddTotesToMinTrolley
                Return updatedSolution Else:
        Return existingSolution
```

FIG. 10

```
AddTotesToMinTrolley:

Repeat:
        For each Tote in remaining totes:
                Add to minPicklist
                Calculate savings
        Pick Tote with +ve maxSaving, update two picklists:
                Remove Tote from source Picklist
                Add Tote to minPicklist Until:
        No more totes to add Or MinPicklist hits tote constraint
```

FIG. 11

SYSTEMS AND METHODS FOR OPTIMIZATION OF PICK WALKS

TECHNICAL FIELD

This disclosure relates generally to pick walk generating systems, and more particularly to optimization of pick walk systems for improved speed of pick walk generation.

BACKGROUND

In general, pick walk generating systems focus on minimizing a time spent and distance traveled by a picker on a pick walk. While numerous methods for generating a pick walk are known in the art, optimization and further refinement of already generated pick walks have proven cumbersome and slow. For example, a commonly used technique for pick walk optimization known as ant colony optimization produces satisfactory solutions, but is known to be time and processing power intensive due to the need to calculate savings among all possible combinations for a pick walk. As users continue to migrate to eCommerce and in-store pick-up for goods, the number of pick walk optimizations needed continues to rise. This problem is compounded by a recent leveling off in advancements in computer processing power due to an oncoming death of Moore's Law. Therefore, there is a need for a pick path optimization system that avoids the problems of prior pick path optimization systems, thereby leading to faster processing times and fewer burdens on processing circuits.

BRIEF DESCRIPTION OF THE DRAWINGS

To facilitate further description of the embodiments, the following drawings are provided in which:

FIG. 6 illustrates representative pseudocode instructions, according to a representative embodiment;

FIG. 8 illustrates representative pseudocode instructions, according to a representative embodiment;

FIG. 9 illustrates representative pseudocode instructions, according to a representative embodiment;

FIG. 10 illustrates representative pseudocode instructions, according to a representative embodiment;

FIG. 11 illustrates representative pseudocode instructions, according to a representative embodiment;

Figure 1:
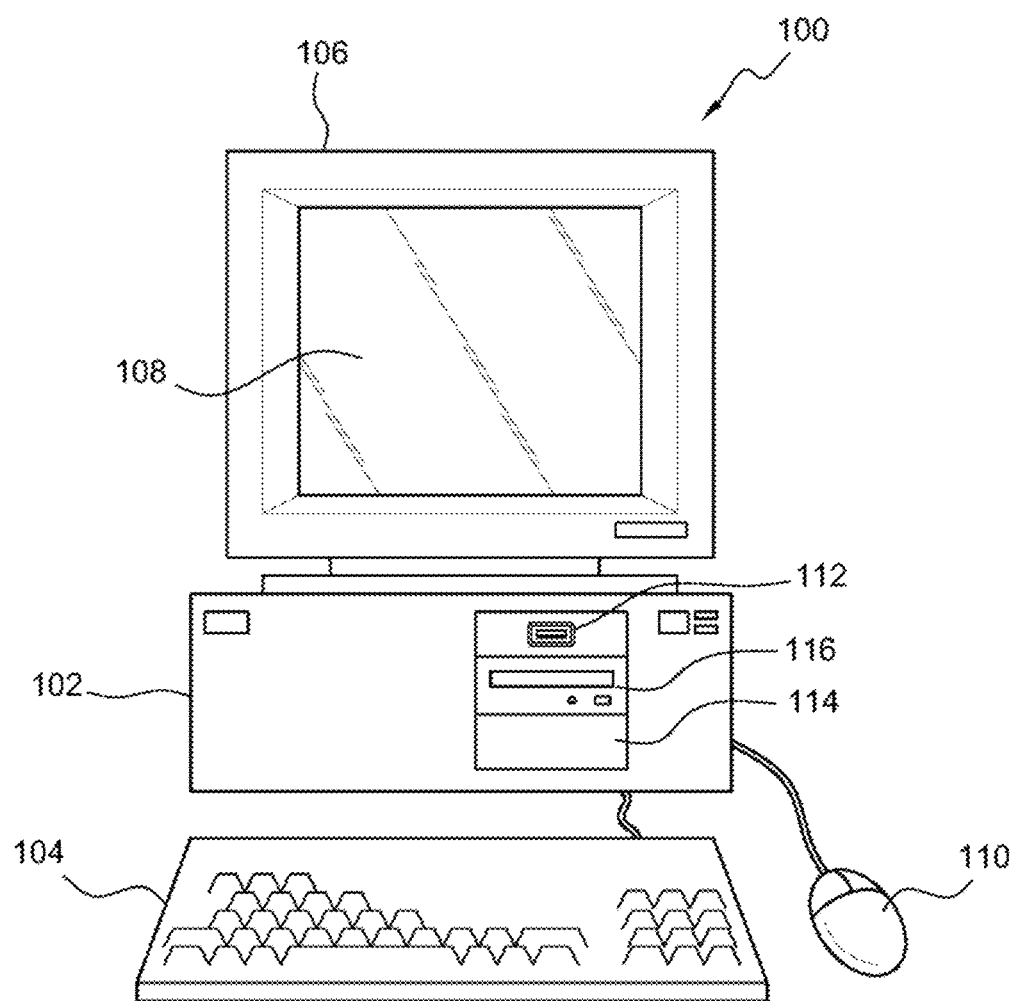
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and perform: receiving a respective number of totes for each respective order of one or more orders; determining, using a first set of rules, when the respective number of totes for a respective order of the one or more orders can be reduced; when the respective number of totes is determined to be able to be reduced, reducing, using a second set of rules, the respective number of totes for the respective order to a respective reduced number of totes for the respective order of the one or more orders; comparing the respective number of totes for the respective order to the respective reduced number of totes for the respective order; and when the respective number of totes for the respective order is compared to be equal to the respective reduced number of totes for the respective order, facilitating displaying, on an electronic device to a picker, the respective number of totes for the respective order.

Various embodiments include a method. The method can be implemented via execution of computing instructions configured to run at one or more processors and configured to be stored at non-transitory computer-readable media The method can comprise receiving a respective number of totes for each respective order of one or more orders; determining, using a first set of rules, when the respective number of totes for a respective order of the one or more orders can be reduced; when the respective number of totes is determined to be able to be reduced, reducing, using a second set of rules, the respective number of totes for the respective order to a respective reduced number of totes for the respective order of the one or more orders; comparing the respective number of totes for the respective order to the respective reduced number of totes for the respective order; and when the respective number of totes for the respective order is compared to be equal to the respective reduced number of totes for the respective order, facilitating displaying, on an electronic device to a picker, the respective number of totes for the respective order.

A number of embodiments can include a system. The system can include one or more processors and one or more non-transitory computer-readable storage devices storing computing instructions. The computing instructions can be configured to run on the one or more processors and perform: executing a greedy incremental batcher loop, which can comprise: selecting a first picklist of one or more picklists; and merging the first picklist with one or more picklists in a first remainder of the one or more picklists when the merging would decrease a cost of the first picklist, wherein the first remainder of the one or more picklists comprises the one or picklists excluding the first picklist; executing a randomized tote local search loop, which can comprise: selecting two random picklists of the one or more picklists, as merged; and swapping totes of the two random picklists of the one or more picklists, as merged, when the swapping would decrease a cost of at least one picklist of the two random picklists; executing an update min trolley loop, which can comprise: selecting a shortest picklist of the one or more picklists, as merged and swapped; and combining the shortest picklist with at least one picklist of the one or more picklists, as merged and swapped, wherein a combination picklist of the shortest picklist and the at least one picklist results in a savings of cost; and facilitating displaying the combination picklist and the one or more picklists, as merged and swapped, to a picker.

Various embodiments include a method. The method can be implemented via execution of computing instructions configured to run at one or more processors and configured to be stored at non-transitory computer-readable media The method can comprise executing a greedy incremental batcher loop, which can comprise: selecting a first picklist of one or more picklists; and merging the first picklist with one or more picklists in a first remainder of the one or more picklists when the merging would decrease a cost of the first picklist, wherein the first remainder of the one or more picklists comprises the one or picklists excluding the first picklist; executing a randomized tote local search loop, which can comprise: selecting two random picklists of the one or more picklists, as merged; and swapping totes of the two random picklists of the one or more picklists, as merged, when the swapping would decrease a cost of at least one picklist of the two random picklists; executing an update min trolley loop, which can comprise: selecting a shortest picklist of the one or more picklists, as merged and swapped; and combining the shortest picklist with at least one picklist of the one or more picklists, as merged and swapped, wherein a combination picklist of the shortest picklist and the at least one picklist results in a savings of cost; and facilitating displaying the combination picklist and the one or more picklists, as merged and swapped, to a picker.

Figure 2:
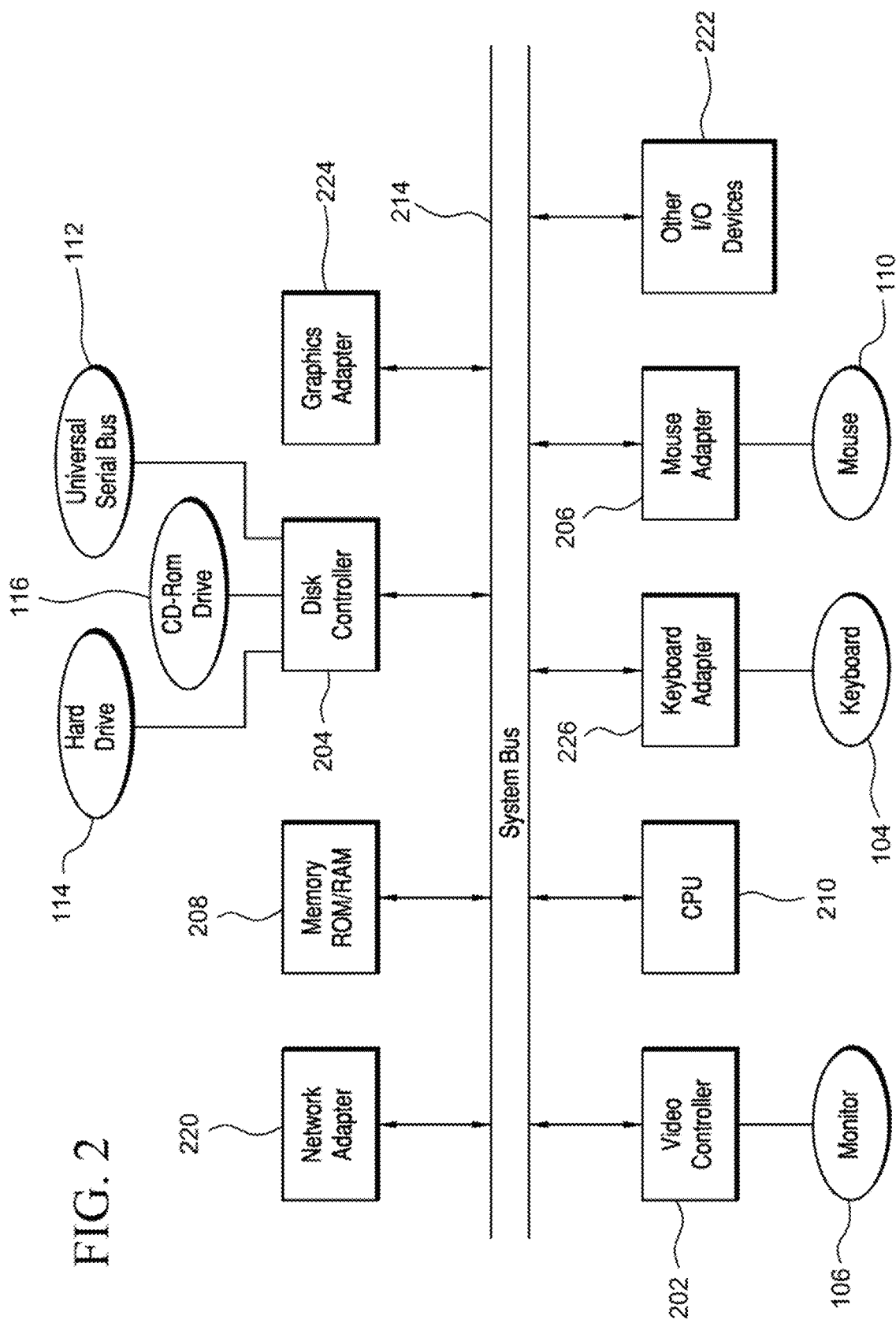
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
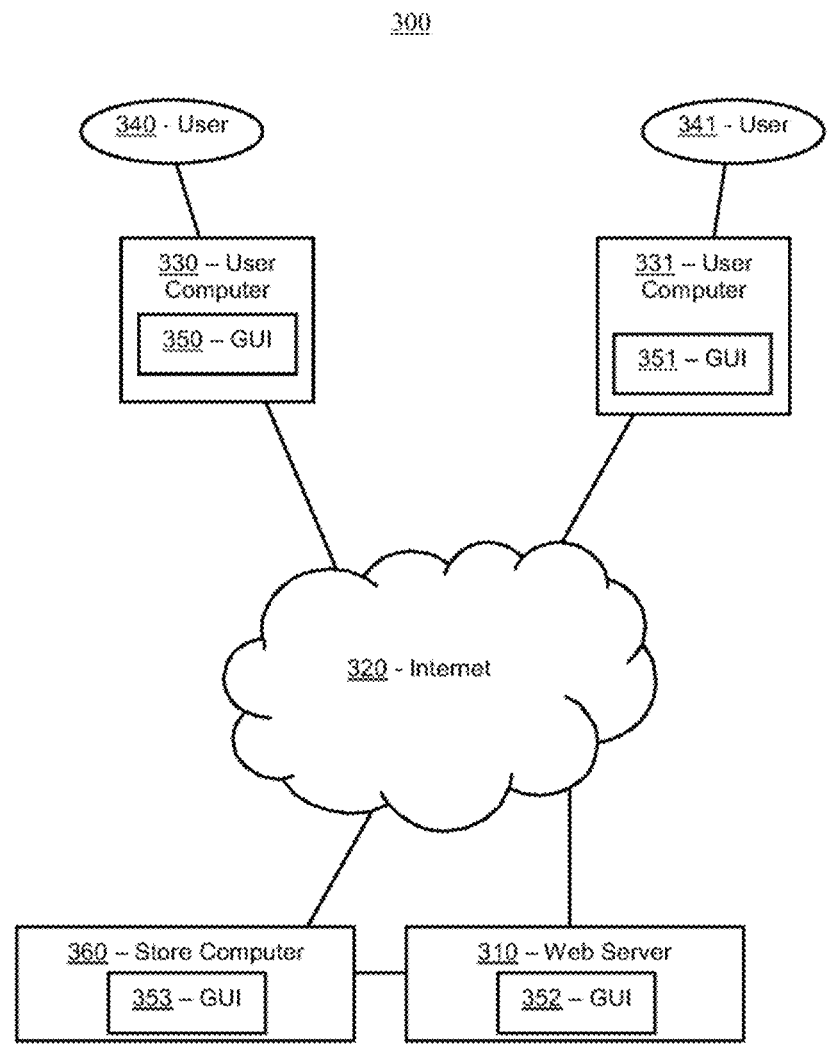
FIG. 3 illustrates a representative block diagram of a system, according to an embodiment.

Turning ahead in the drawings, FIG. 3 illustrates a block diagram of a system 300 that can be employed for optimization of pick walks, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a web server 310 and/or a store computer 360. Web server 310 and/or store computer 360 can each be a computer system, such as computer system 100 (FIG. 1), as described above, and can each be a single computer, a single server, or a cluster or collection of computers or servers, or a cloud of computers or servers. In another embodiment, a single computer system can host each of two or more of web server 310 and/or store computer 360. In these or other embodiments, web server 310 and/or store computer 360 can comprise a second system 400, which is described in further detail below. Additional details regarding web server 310 and/or store computer 360 are described herein.

In many embodiments, system 300 also can comprise user computers 330, 331. In other embodiments, user computers 330, 331 are external to system 300. User computers 330, 331 can comprise any of the elements described in relation to computer system 100. In some embodiments, user computers 330, 331 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In many embodiments, system 300 can comprise graphical user interface ("GUI") 350-353. In the same or different embodiments, GUI 350-353 can be part of and/or displayed by user computers 330, 331, which also can be part of system 300. In some embodiments, GUI 350-353 can comprise text and/or graphics (image) based user interfaces. In the same or different embodiments, GUI 350-353 can comprise a heads up display ("HUD"). When GUI 350-353 comprises a HUD, GUI 350-353 can be projected onto glass or plastic, displayed in midair as a hologram, or displayed on monitor 106 (FIG. 1). In various embodiments, GUI 350-353 can be color or black and white. In many embodiments, GUI 350-353 can comprise an application running on a computer system, such as computer system 100, user computers 330, 331, server computer 310, and/or store computer 360. In the same or different embodiments, GUI 350-353 can comprise a website accessed through internet 320. In some embodiments, GUI 350-353 can comprise an eCommerce website. In the same or different embodiments, GUI 350-353 can be displayed as or on a virtual reality (VR) and/or augmented reality (AR) system or display. In some embodiments, an interaction with a GUI can comprise a click, a look, a selection, a grab, a view, a purchase, a bid, a swipe, a pinch, etc.

In some embodiments, web server 320 can be in data communication through Internet 320 with user computers (e.g., 350-353). In certain embodiments, user computers 350-351 can be desktop computers, laptop computers, smart phones, tablet devices, and/or other endpoint devices. Web server 310 and/or store computer 360 can host one or more websites. For example, web server 310 and/or store computer 360 can host an eCommerce website that allows users to browse and/or search for products, to add products to an electronic shopping cart, and/or to purchase products, in addition to other suitable activities.

In many embodiments, web server 310 and/or store computer 360 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) web server 310 and/or store computer 360 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of web server 310 and/or store computer 360. In a similar manner, the processing module(s) and the memory storage module(s) can be local and/or remote to each other.

In many embodiments, web server 310 and/or store computer 360 can be configured to communicate with one or more user computers 330 and 331. In some embodiments, user computers 330 and 331 also can be referred to as customer computers and/or picker computers. In some embodiments, web server 310 and/or store computer 360 can communicate or interface (e.g., interact) with one or more user computers 330 and 331 through a network or internet 330. Internet 330 can be an intranet that is not open to the public. Accordingly, in many embodiments, web server 310 and/or store computer 360 (and/or the software used by such systems) can refer to a back end of system 300 operated by an operator and/or administrator of system 300, and user computers 350-353 (and/or the software used by such systems) can refer to a front end of system 300 used by one or more users 340, 341, respectively. In some embodiments, users 340, 341 can also be referred to as customers, in which case, user computers 330, 331 can be referred to as customer computers. In other embodiments, users 340, 341 can be referred to as pickers, in which case, user computers 330, 331 can be referred to as picker computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, web server 310 and/or store computer 360 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between web server 310 and/or store computer 360, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In many embodiments, the techniques described herein can provide a practical application and several technological improvements. In some embodiments, the techniques described herein can provide for improved processing times for pick path optimization. These techniques described herein can provide a significant improvement over conventional approaches of pick path optimization, such as ant colony optimization. In many embodiments, the techniques described herein can beneficially make determinations based on dynamic order information that is continually fed into the system and efficiently optimized in real time.

In a number of embodiments, the techniques described herein can solve a technical problem that arises only within the realm of computer networks, as pick path optimization system do not exist outside the realm of computer networks.

Figure 4:
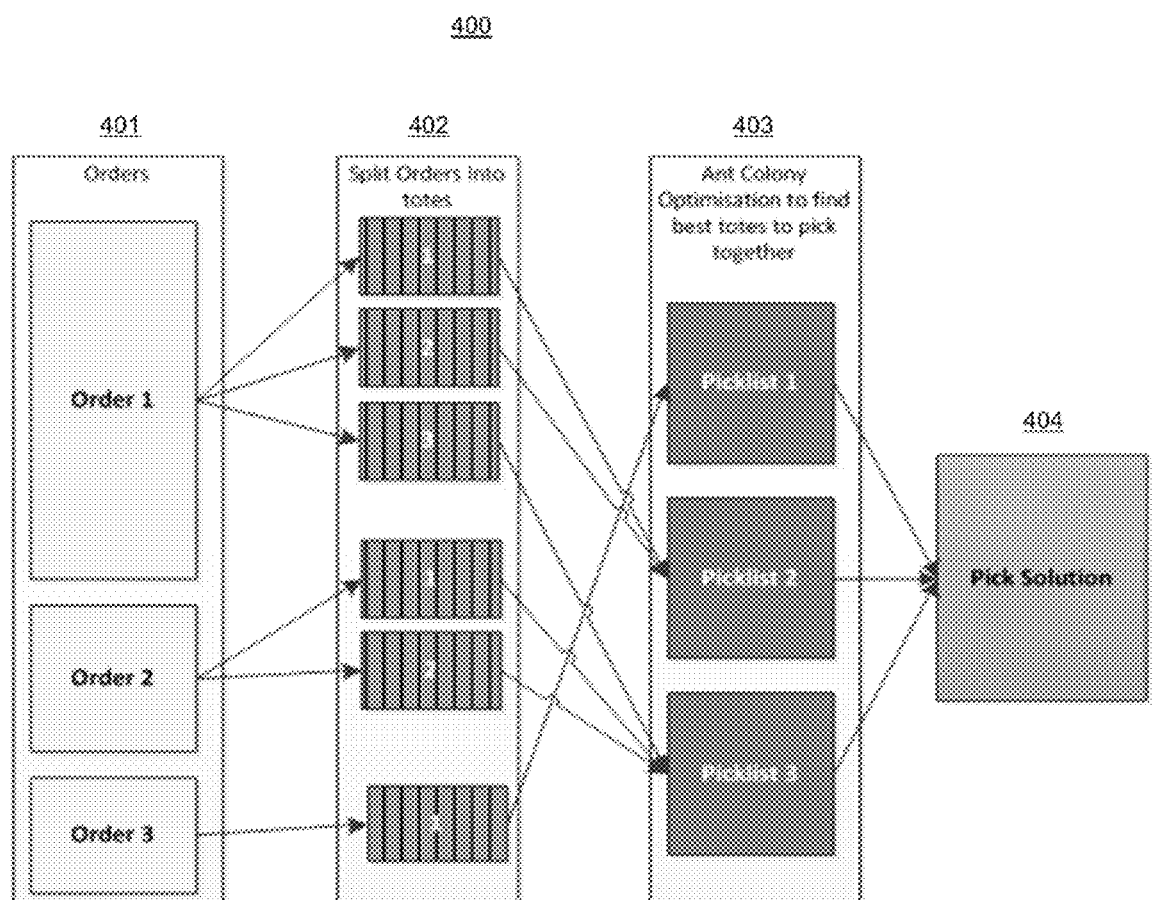
FIG. 4 illustrates a flowchart for a method, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as web server 310 and/or store computer 360 (FIG. 3).

The processing module(s) can be similar or identical to the processing module(s) described above with respect to computer system 100 (FIG. 1).

In many embodiments, method 400 can comprise an activity 401 of receiving one or more orders. In some embodiments, one or more orders can be placed via user computers 330-331 (FIG. 3) and/or store computer 360 (FIG. 3). In these or other embodiments, one or more orders can be entered into user computers 330-331 (FIG. 3) and/or store computer 360 (FIG. 3) via GUIs 350-351 (FIG. 3) and/or GUI 353 (FIG. 3). In various embodiments, orders can be placed via an ecommerce website displayed on user computers 330-331 (FIG. 3) and/or store computer 353 (FIG. 3). In many embodiments, an order can comprise one or more items. In various embodiments, the one or more items can be store in a brick and mortar store and/or a warehouse. In the embodiment of FIG. 4, there are three orders.

Figure 5:
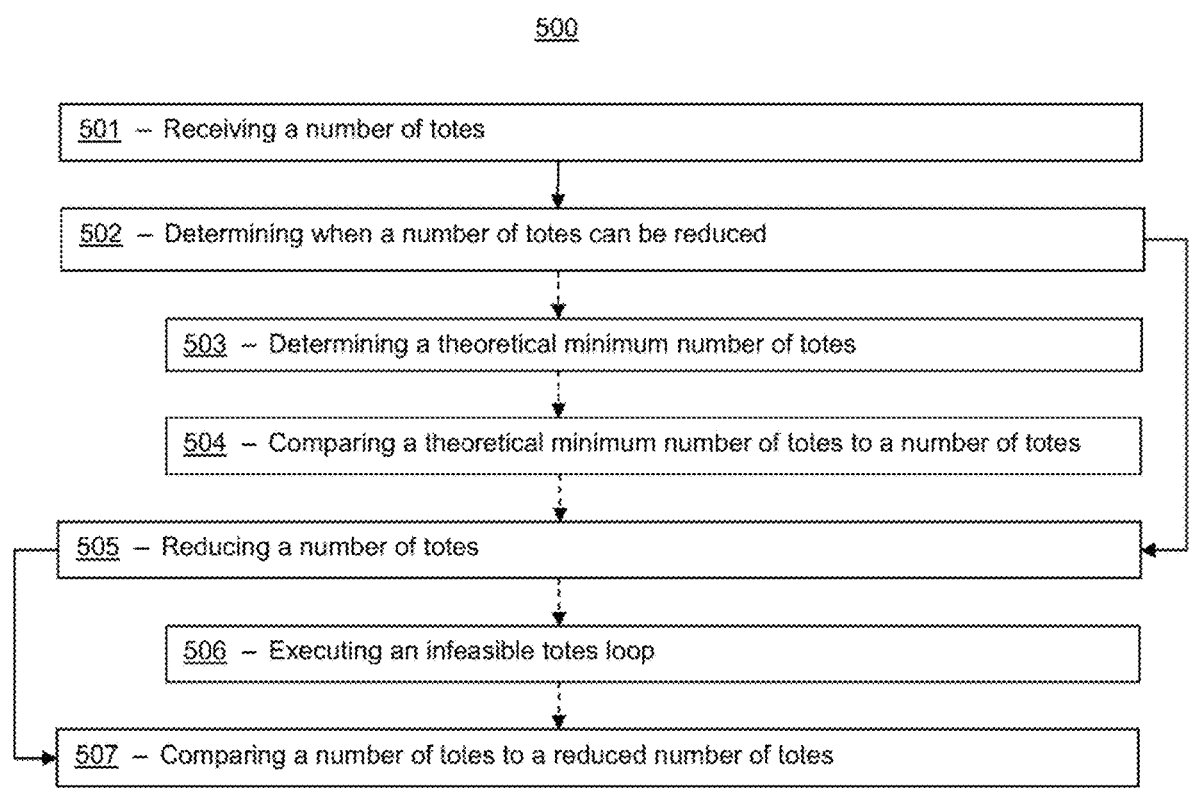
FIG. 5 illustrates a flowchart for a method, according to certain embodiments.

In many embodiments, method 400 can comprise an activity 402 of splitting an order into one or more totes. In some embodiments, a tote can comprise a container configured to hold one or more items. In these or other embodiments, one or more totes can be configured to be loaded onto a cart. In this way, one or more totes can travel around a brick and mortar store and/or a warehouse with a picker during a pick walk. Each picker can bring pull one or more carts with such picker during the pick walk of the picker. In various embodiments, each of the totes used in method 400 are identical to each other in size, shape, volume, carrying capacity, etc., and in other embodiments, different totes can have different sizes, shapes, volumes, carrying capacities, etc. Similarly, in various embodiments, each of the carts used in method 400 are identical to each other in size, shape, volume, carrying capacity, etc., and in other embodiments, different totes can have different sizes, shapes, volumes, carrying capacities, etc. As used herein, a "pick walk" refers to a path taken by a picker to collect items(s) of an order. In many embodiments, activity 402 can comprise method 500 (FIG. 5). In other embodiments, activity 402 can comprise one or more of and/or portions of one or more activities of method 500 (FIG. 5). In various embodiments, activity 402 can be performed without any part of method 500 (FIG. 5). In the embodiment of FIG. 4, the three orders from activity 401 are split into different numbers of totes—the first orders has three totes; the second order has two totes; and the third order has a single tote.

In many embodiments, method 400 can comprise an activity 403 of batching one or more totes. In some embodiments, activity 403 can comprise method 600 (FIG. 6). In other embodiments, activity 403 can comprise one or more and/or portions of one or more activities of method 600 (FIG. 6). In various embodiments, activity 403 can be performed without any part of method 600 (FIG. 6). In various embodiments, batching can comprise assigning one or more totes to one or more pickers for a pick walk, such that one or more pickers can be assigned to pick the respective items for any single order. In the embodiment of FIG. 4, the single tote of the third order is batched into a first picklist; two totes from the first order are batched into a second picklist; and a third tote from the first order and the two totes from the second order are batched into a third picklist.

In many embodiments, method 400 can comprise an activity 404 facilitating displaying a picklist on an electronic device or store computer 360 (FIG. 3). In various embodiments, a picklist can comprise one or more totes for one or more orders. In some embodiments, a store computer can be carried by a picker during a pick walk. In these or other embodiments, a map of a store and/or a warehouse can be displayed, and the map can comprise directions for the pick walk. In various embodiments, directions for a pick walk can comprise turn by turn directions and/or a route overlaid or displayed on the map.

In one embodiment, as illustrated in FIG. 4, a first pick list can be shown on a first store computer or electronic device for a first picker, and the first pick list can comprise the single tote for the third order. In this same embodiment of FIG. 4, a second pick list can be shown on a second store computer or electronic device for a second picker, and the second pick list can comprise two totes for the first order. Also in this same embodiment of FIG. 4, a third pick list can be shown on a third store computer or electronic device for a third picker, and the third pick list can comprise three totes—the third tote for the first order and the two totes for the second order. In this embodiment, a single picker is assigned to pick all of the items in the third order, and a different single picker is assigned to pick all of the items in the second order, and a third picker and the different single picker are assigned to pick the items in the first order.

In a different embodiment, as also can be illustrated by FIG. 4, the three aforementioned pick lists can be transmitted to a single electronic device for a single picker, who is assigned to pick the first pick list first, and then the second pick list, and the third pick last. This different embodiment can be useful, for example, when there are time constraints for the third order to be picked before the first and second orders. In another embodiment, as also can be illustrated by FIG. 4, if the time constraints for the three orders do not impact the picking order for the pick lists, then the three aforementioned pick lists can be transmitted to a single electronic device for a single picker, who can pick the three pick lists in any order, as long as the single picker completely picks all of the items in one pick list before beginning to pick any items for the next pick list. Other embodiments also are possible.

In many embodiments, after the items are picked for an order, activity 404 can further comprise displaying packing instructions on a store computer 360. In these or other embodiments, packing instructions can comprise directions on packing items of an order into one or more containers for receipt by a user, particularly when one or more of the items should be kept at one temperature (i.e., cold) while other items can be kept at a different temperature (i.e., room temperature). In various embodiments, an order and/or a portion of an order can be picked up by a user at a brick and mortar store. In these or other embodiments, an order and/or a portion of an order can be delivered to a user at one or more addresses.

Turning ahead in the drawings, FIG. 5 illustrates a flow chart for a method 500, according to an embodiment. Method 500 is merely exemplary and is not limited to the embodiments presented herein. Method 500 can be employed in many different embodiments or examples not specifically depicted or described herein. In some embodiments, the activities of method 500 can be performed in the order presented. In other embodiments, the activities of method 500 can be performed in any suitable order. In still other embodiments, one or more of the activities of method 500 can be combined or skipped. In many embodiments, system 300 (FIG. 3) can be suitable to perform method 500 and/or one or more of the activities of method 500. In these or other embodiments, one or more of the activities of method 500 can be implemented as one or more computer instructions configured to run at one or more processing modules and configured to be stored at one or more non-transitory memory storage modules. Such non-transitory memory storage modules can be part of a computer system such as web server 310 and/or store computer 360 (FIG. 3). The processing module(s) can be similar or identical to the processing module(s) described above with respect to computer system 100 (FIG. 1).

In many embodiments, method 500 can comprise an activity 501 of receiving a number of totes. In various embodiments, a number of totes can be determined using an order received in activity 401 (FIG. 4). In some embodiments, items in an order can be ordered by sequence ID, and totes comprising the items can be created using the sequence ID for each respective item. In some embodiments, a sequence ID can correspond with an items location in a warehouse and/or brick a mortar store. In many embodiments, items can be sorted, filtered, and/ordered using a sequence ID. In these or other embodiments, items can be placed into totes using a sequence ID. In many embodiments, an a list of items can be placed sequentially into a tote using a sequence ID as forted, filtered, and/or ordered. In some embodiments, items can be place into a tote until a maximum weight capacity of a tote and/or a maximum volume capacity of a tote is reached and/or exceeded. In these or other embodiments, a new tote can be added to an order when a maximum weight capacity of a tote and/or a maximum volume capacity of a tote is reached and/or exceeded. In various embodiments, a number of totes can be determined by summing a number of totes added to an order. In some embodiments, a number of totes for an order can be received with an order in activity 501. In these embodiments, a number of totes can be determined by an exogenous system. In various embodiments, a number of totes can be determined before or during activity 501. In some embodiments, a number of totes can be determined in parallel with activity 501.

In many embodiments, method 500 can comprise an activity 502 of determining when a number of totes can be reduced. In some embodiments, a first set of rules can be used to determine when a number of totes can be reduced. In many embodiments, method 500 can optionally comprise an activity 503 of determining a theoretical minimum number of totes. In some embodiments, activity 503 can be performed after and/or as a part of activity 502. In various embodiments, activity 503 can be performed entirely separate from activity 502. In these or other embodiments, a first set of rules can comprise calculating a theoretical minimum number of totes for an order. In many embodiments, calculating a theoretical minimum number of totes can comprise calculating a total weight for an order using a weight of each item in the order. In these embodiments, a total weight for an order can then be divided by a maximum weight capacity of a tote to determine a theoretical minimum number of totes. In these or other embodiments, calculating a theoretical minimum number of totes can comprise calculating a total volume for an order using a volume of each item in the order. In these embodiments, a total volume for an order can then be divided by a maximum volume capacity of a tote to determine a theoretical minimum number of totes. In some embodiments, a maximum weight capacity of a tote and/or a maximum volume capacity of a tote can comprise a Boolean value that indicates when a maximum weight capacity of a tote and/or a maximum volume capacity of a tote can be applied to an order and/or a tote within the order.

In many embodiments, method 500 can further optionally comprise an activity 504 of comparing a theoretical minimum number of totes to the number of totes received in activity 501. In some embodiments, activity 504 can be performed after and/or as a part of activity 502. In various embodiments, activity 504 can be performed entirely separate from activity 502. Activity 504 can be performed before or after activity 503.

In some embodiments, when a theoretical minimum number of totes is equal to the number of totes received, method 500 can terminate. In some embodiments, when method 500 has terminated, activity 404 (FIG. 4) can be then be performed by displaying the number of totes on a store computer 360 (FIG. 3) as part of a picklist, where the number of totes is as received in activity 501, as returned after activity 507 (described below), or as returned from a previous iteration of an infeasible totes algorithm of activity 506 (described below). In many embodiments, when method 500 has terminated, all or a part of method 700 (FIG. 7) can be performed. In various embodiments, when a theoretical minimum number of totes is not equal to a number of totes, method 500 can continue, as explained in the following paragraphs.

In many embodiments, method 500 can comprise an activity 505 of reducing a number of totes. In these or other embodiments, the number of totes can be received as described in activity 501, and/or returned after activity 507, as described below. In various embodiments, reducing a number of totes can comprise creating a reduced number of totes.

In some embodiments, reducing a number of totes can comprise executing a greedy tote reduction algorithm using a maximum volume capacity of each tote of one or more totes. In various embodiments, a greedy algorithm can be configured to make a locally optimal choice at certain steps of an algorithm. In this way, a greedy algorithm can approximate and/or find a global optimum. In some embodiments, a greedy algorithm can approximate and/or find a globally optimal solution in a reasonable amount of time using a shorter (e.g. faster and/or with fewer burdens on a processor) and/or less data intensive process than traditional optimization algorithms. In many embodiments, a tote reduction algorithm can be greedy when the algorithm is configured to choose a locally optimal choice based on a weight of an item and/or a volume of an item. In many embodiments, a locally optimal choice can comprise choosing items of highest volume and/or weight first. In this way, a greedy tote reduction algorithm can approximate and/or find a globally optimal arrangement of items within totes. In these or other embodiments, a maximum volume capacity can be the same for each tote of the one or more totes. In some embodiments, the maximum volume capacity can be different, in which case a different greedy tote reduction algorithm can be used. In many embodiments, reducing a number of totes can comprise executing a greedy tote reduction algorithm using a maximum weight capacity of each tote of one or more totes. In these or other embodiments, a maximum weight capacity can be the same for each tote of the one or more totes. In some embodiments, the maximum weight capacity can be different, in which case a different greedy tote reduction algorithm can be used. In various embodiments, a greedy tote reduction algorithm can comprise an infeasible tote loop, as described in further detail below. In some embodiments, a reduced number of totes can be determined when an infeasible totes loop and/or a portion of an infeasible totes loop terminates. In these embodiments, a reduced number of totes, as determined via executing the greedy tote reduction algorithm and ending the infeasible totes loop, can be set as the number of totes for the order.

Accordingly, in many embodiments, method 500 can optionally comprise an activity 506 of executing (i.e. running) an infeasible totes loop. In various embodiments, activity 506 can be performed as a part of and/or after activity 505. In many embodiments, activity 506 can be performed completely separate from activity 505. In various embodiments, a second set of rules can comprise an infeasible totes loop. In various embodiments, an infeasible totes loop can be used to determine a reduced number of totes. In many embodiments, an infeasible tote loop can comprise all or a part of a set of instructions embodied in pseudocode shown in FIG. 6. In some embodiments, an infeasible totes loop can comprise determining a theoretical number of totes, as described in activity 503. In various embodiments, a theoretical minimum number of totes can be compared to the number of totes received or determined, as described above and below. For example, in these embodiments, the number of totes can be a number of totes received, as described in 501. As another example, in other embodiments, the number of totes can be the number of totes as returned from a previous iteration of an infeasible totes algorithm or portions of an infeasible totes algorithm. As a further example, in these embodiments, the number of totes can be a number of totes, as returned after activity 507 (described below).

In some embodiments, when a theoretical minimum number of totes is equal to a number of totes, an infeasible totes algorithm can terminate. In some embodiments, when the infeasible totes algorithm has terminated, activity 404 (FIG. 4) can be then be performed by displaying the number of totes, as received or determined, as described above and below, on a store computer 360 (FIG. 3) as part of a picklist. In many embodiments, when an infeasible totes algorithm has terminated, all or a part of method 700 (FIG. 7) can be performed. In various embodiments, when a theoretical minimum number of totes is not equal to the number of totes, then the number of totes can be determined to be reducible.

In many embodiments, an infeasible totes loop can proceed when a theoretical minimum number of totes is less than or equal to a number of totes, as received or determined. In these or other embodiments, an infeasible tote loop can comprise creating one or more infeasible totes using items in totes comprising the number of totes. In some embodiments, an infeasible tote can comprise a tote that cannot exist because it violates a maximum weight and/or maximum volume restriction (i.e. capacity) of the tote. In many embodiments, an infeasible tote can be created by adding items into a theoretical minimum number of totes. In these or other embodiments, an item (or an item of items remaining in an order) with a largest volume and/or a largest weight can be added first. In various embodiments, remaining items can be added to each tote of the theoretical minimum number of totes having a largest remaining volume capacity and/or a largest remaining weight capacity. In these or other embodiments, items can be added to a tote of the theoretical minimum number of totes until a last item added to the tote violates a maximum weight and/or maximum volume restriction of the tote. In these or other embodiments, an infeasible tote ratio can be determined for each tote created. In many embodiments, an infeasible tote ratio can comprise a sum of an unused ratio in weight, an overused ratio in weight, an unused ratio in volume, and/or an overused ratio in volume. In many embodiments, an unused and/or overused ratio in weight can be a ratio between a total weight of item(s) in the tote to a maximum weight of the tote. In these or other embodiments, an unused and/or overused ratio in volume can be a ratio between a total volume of item(s) in the tote to a maximum volume of the tote.

In various embodiments, an infeasible tote loop can proceed by adding a heaviest item of an order to a tote having a smallest infeasible tote ratio. After doing so, if the items in the tote violate the maximum weight and/or maximum volume of the tote, then the infeasible loop can repeat by adding remaining heaviest items, one at a time, of the order to the tote until the tote is full (i.e., the maximum weight and/or maximum volume is reached) and/or until there are no more remaining items of the order to add to the tote. Then, a remaining tote having the second smallest infeasible tote ratio is filled by adding a remaining heaviest item of the order to the remaining tote. After doing so, if the items in the remaining tote violate the maximum weight and/or maximum volume of the remaining tote, then the infeasible loop can repeat again by adding remaining heaviest items, one at a time, of the order to the remaining tote until the remaining tote is full (i.e., the maximum weight and/or maximum volume is reached) and/or until there are no more remaining items of the order to add to the remaining tote. This process is repeated until there are no more remaining items to add to a remaining tote.

In many embodiments, an infeasible totes loop can comprise executing a large scale neighborhood search using infeasible tote ratios. In various embodiments, a neighborhood search can be configured to identify near-optimal and/or optimal solutions to an optimization problem by repeatedly transforming a current solution into a different solution in a neighborhood of a current solution. In some embodiments a neighborhood of a solution can comprise a set of similar solutions obtained by making modifications to an original solution. In many embodiments, a neighborhood search can be performed on a larger, and in some embodiments, exponentially sized neighborhood. In these embodiments, a large scale neighborhood search can outperform a neighborhood search because local improvements are larger, and therefore allows a neighborhood search to escape from a local minima to find a more optimal solution. In these or other embodiments, a large scale neighborhood search can comprise an item exhaustive large scale neighborhood search. In these or other embodiments, an item exhaustive search can determine most or all possible combinations of items that can be swapped between totes, thereby searching for a best swap. In many embodiments, an item exhaustive large scale neighborhood search can continue until no savings can be found and/or it reaches a maximum number of iterations.

In many embodiments, a third set of rules can comprise an item exhaustive large scale neighborhood search. In some embodiments, an item exhaustive large scale neighborhood search can be referred to as a large scale neighborhood search. In these or other embodiments, a large scale neighborhood search can comprise determining when items can be swapped between two totes. In these or other embodiments, determining when items can be swapped can comprise selecting two items from two different totes. In various embodiments, all possible swaps for an order can be determined. In many embodiments, four infeasible tote ratios can be determined using the two items from two different totes. In various embodiments, the four infeasible tote ratios can be computed for the original two totes and modified two totes created by swapping the two items between the original two totes, where each of the four totes has a different one of the four infeasible tote ratios. In some embodiments, a savings of a swap can be determined using the four infeasible tote ratios. In these or other embodiments, a savings of a swap can be determined by subtracting a sum of the infeasible tote ratios of two totes created by swapping from a sum of the infeasible tote ratios of the two totes. In many embodiments, all possible swaps for an order can be determined. In some embodiments, swaps that create a negative savings can be discarded and/or filtered out. In embodiments where all swaps create a negative savings, an infeasible loop can be terminated. In some embodiments, when an infeasible totes algorithm has terminated, activity 404 (FIG. 4) can be then be performed by displaying the number of totes, as received or determined, as described herein, on a store computer 360 (FIG. 3) as part of a picklist. In various embodiments, when an infeasible totes algorithm has terminated, all or a part of method 700 (FIG. 7) can be performed.

In many embodiments, swaps that create a positive savings (or a list of all swaps when discarding/filtering is not performed) can be sorted from most savings to least savings. In these or other embodiments, a swap with a highest savings can be made. In some embodiments, each tote in a large scale neighborhood search can have only one swap performed using it. In various embodiments, a large scale neighborhood search can proceed by determining when a tote in the large scale neighborhood search violates a maximum weight and/or maximum volume restriction of a tote. In many embodiments, when no totes in a large scale neighborhood search violate a maximum weight and/or maximum volume restriction of a tote, an infeasible totes algorithm can terminate. In some embodiments, when an infeasible totes algorithm has terminated, activity 404 (FIG. 4) can be then be performed by displaying, an electronic device to the picker, the number of totes, as received or determined, as described herein. In various embodiments, when an infeasible totes algorithm has terminated, all or a part of method 700 (FIG. 7) can be performed. In embodiments where one or more totes in a large scale neighborhood search violate a maximum weight and/or maximum volume restriction of a tote (e.g., when a swap cannot be made), a number of totes used in all or a portion of an infeasible totes loop can be increased, and the infeasible totes loop can be repeated until all totes adhere to the maximum weight and maximum volume restriction of the tote.

Returning now to FIG. 5, in many embodiments, method 500 can comprise an activity 507 of comparing a number of totes to a reduced number of totes. In some embodiments, when a reduced number of totes is equal to the number of totes for an order, method 500 can be completed, and activity 404 (FIG. 4) can be performed by displaying, on an electronic device to a picker, the number of totes of the order or as returned or determined, as described herein. In many embodiments, all or a part of method 700 (FIG. 7) can be performed when a reduced number of totes is equal to a number of totes for an order. In embodiments where a reduced number of totes for the order is not equal to (or is less than) the previously calculated number of totes for the order, then, totes of the reduced number of totes can be set to be the number of totes of the order, and all or portions (i.e., at least activities 505 and 507) of method 500 can be performed again to further reduce the number of totes for the order.

Figure 7:
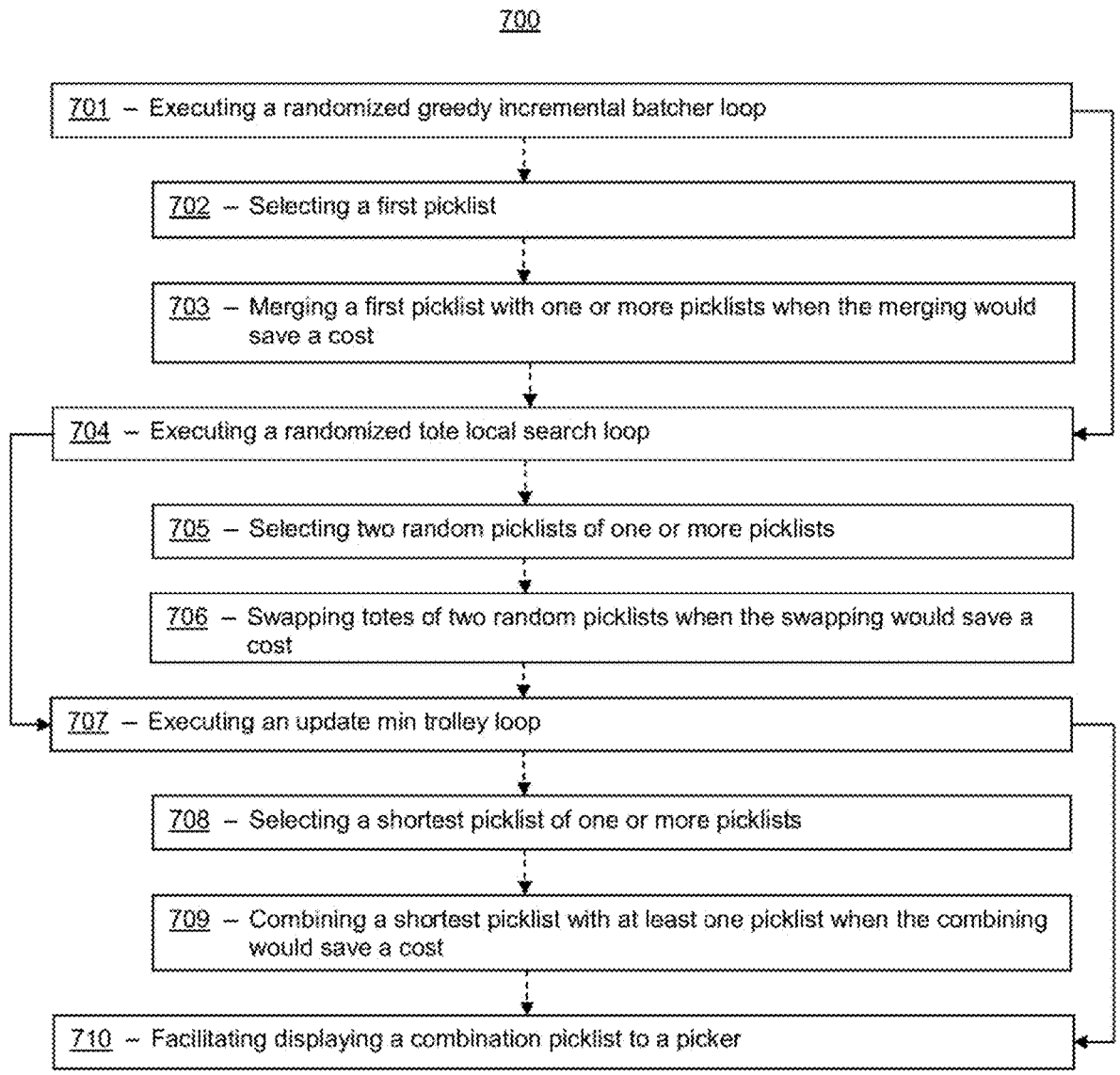
FIG. 7 illustrates a flowchart for a method, according to certain embodiments.

Turning ahead in the drawings, FIG. 7 illustrates a flow chart for a method 700, according to an embodiment. Method 700 is merely exemplary and is not limited to the embodiments presented herein. Method 700 can be employed in many different embodiments or examples not specifically depicted or described herein. In some embodiments, the activities of method 700 can be performed in the order presented. In other embodiments, the activities of method 700 can be performed in any suitable order. In still other embodiments, one or more of the activities of method 700 can be combined or skipped. In many embodiments, system 300 (FIG. 3) can be suitable to perform method 700 and/or one or more of the activities of method 700. In these or other embodiments, one or more of the activities of method 700 can be implemented as one or more computer instructions configured to run at one or more processing modules and configured to be stored at one or more non-transitory memory storage modules. Such non-transitory memory storage modules can be part of a computer system such as web server 310 and/or store computer 360 (FIG. 3). The processing module(s) can be similar or identical to the processing module(s) described above with respect to computer system 100 (FIG. 1). In some embodiments, all or a portion of method 700 can be performed after method 500 (FIG. 5). In various embodiments, all or portions of method 700 can be performed independently of method 500 (FIG. 5).

In many embodiments, method 700 can comprise an activity 701 of executing a randomized greedy incremental batcher loop. In some embodiments, a randomized greedy incremental batcher loop can be configured to identify and/or perform a merge when the merge results in a maximum savings (thereby selecting a locally optimal solution). In these or other embodiments, executing a randomized greedy incremental batcher loop can comprise performing activities 702-703. In various embodiments, activities 702-703 can be performed without executing a randomized greedy incremental batcher loop. In many embodiments, a randomized greedy incremental batcher loop can comprise all or a part of a set of instructions embodied in pseudocode shown in FIG. 8.

Returning now to FIG. 7, in many embodiments, method 700 can comprise an activity 702 of selecting a first picklist. In some embodiments, a first picklist can be received with one or more picklists. In these or other embodiments, one or more picklists can have been generated using all or a part of activity 401 (FIG. 4), all or a part of activity 402 (FIG. 4), and/or all or a part of method 500 (FIG. 5). In many embodiments, selecting a first picklist can comprise receiving one or more totes. In these or other embodiments, each tote can be assigned to one or more picklists. In various embodiments, only one tote can be assigned to each of one or more picklists. In many embodiments, each picklist can have its own cost calculated for it. In various embodiments, a cost can function as a proxy for an approximate amount of time it will take a picker to pick a picklist. In these or other embodiments, a cost can be calculated by summing a total walk time of a pick, a total turn time of a pick, a total line time of a pick, a total processing time of a pick, and/or a total setup time of a pick. In some embodiments, a total walk time of a pick can comprise an amount of time a picker performing the pick is predicted to be walking. In many embodiments, a total turn time of a pick can comprise an amount of time a picker performing the pick is predicted to be turning while walking to pick the next item. In these or other embodiments, a total line time of a pick can comprise an amount of time a picker performing the pick is predicted to be standing in line waiting at the deli counter, the meat counter, the seafood counter, the bakery, the checkout line, etc. If the picking is performed in a retail store (and not in a warehouse), the total line time can vary depending on the time of day and how busy the store is during that time of day. In various embodiments, a total processing time of a pick can comprise an amount of time a picker performing the pick is predicted to be scanning and packing items of the pick. In the same or different embodiments a total setup time of a pick can comprise an amount of time a picker performing the pick is predicted to be setting up, labeling, and/or packing one or more totes of the pick.

In many embodiments, one or more picklists can be sorted by cost. In these or other embodiments, a picklist with a lowest cost can be selected, and a remainder of one or more picklists can be retained. In various embodiments, one or more potential mergers between a picklist with a lowest cost and a remainder of one or more picklists can be determined in an activity 703 of method 700. In the same or different embodiments, a cost can be calculated for each of one or more potential mergers as described above. In many embodiments, a savings for each of one or more potential mergers can be calculated using a cost for each of one or more potential mergers and a cost of a picklist with a lowest cost. In these or other embodiments, a savings can be calculated by subtracting a cost of a picklist with a lowest cost from a cost of each of one or more potential mergers. In some embodiments, a negative savings can be a proxy for an inefficient merge, and/or a positive savings can be a proxy for an efficient merge. In many embodiments, a merger of one or more potential merger having a highest savings can be selected. In various embodiments, a merger having a highest savings can be set to be and/or used as a picklist with a lowest cost, and the aforementioned merging algorithm can be performed again using the merger having the highest savings and a remainder of one or more picklists having not been merged.

In embodiments where savings for all mergers are negative, the most recent round of potential mergers can be unmerged or deleted, thereby leaving a picklist with a lowest cost and a remainder of one or more picklists. In some embodiments, the picklist with a lowest cost can comprise a merged picklist. In these or other embodiments, a picklist with the lowest cost can then be retained, and a greedy incremental batcher loop can be repeated using the remainder of one or more picklists. In many embodiments, a greedy incremental batcher loop can terminate when only one picklist remains in a remainder of one or more picklists.

In many embodiments, method 700 can comprise an activity 704 of executing a randomized tote local search loop. In some embodiments, a randomized tote local search loop can be configured to move from solution to solution in a space of candidate solutions (e.g., the search space) by applying local changes, until a solution deemed optimal is found or a time bound (e.g., a maximum number of iterations) has elapsed. In these or other embodiments, executing a randomized tote local search loop can comprise performing activities 705-706. In various embodiments, activities 705-706 can be performed without executing a randomized tote local search loop. In many embodiments, a randomized tote local search loop can comprise all or a part of a set of instructions embodied in pseudocode shown in FIG. 9.

Returning now to FIG. 7, in many embodiments, method 700 can comprise an activity 705 of selecting two random picklists of one or more picklists. In some embodiments, two random picklists can comprise one or more merged picklists, as created by at least a portion of a randomized greedy incremental batcher loop. In these or other embodiments, a first random picklist can be randomly selected using a weighted technique. In the same or different embodiments, a weighted technique can be configured to weight a randomness of a selection of a first random picklist towards selecting a most expensive picklist of one or more picklists. In these or other embodiments, a randomness of a selection of a first random picklist can be determined using a roulette wheel selection algorithm. In many embodiments, a roulette wheel selection algorithm can be weighted by an average tote cost per picklist of one or more picklists. In many embodiments, an average tote cost per picklist can be determined by summing a cost of each tote, and then dividing by a number of totes in a picklist. In some embodiments, a second random picklist can be randomly selected using a heuristic that approximates true randomness. In these or other embodiments, a randomness of a selection of a second random picklist can be unweighted. In various embodiments, a picklist can comprise one or more totes. In these or other embodiments, totes in a first random picklist can be assigned an index number having a maximum value comprising a maximum number of totes. In various embodiments, a maximum number of totes can be determined via a carrying capacity of a cart.

In many embodiments, method 700 can comprise an activity 706 of swapping totes of two random picklists when the swapping would save a cost. In some embodiments, swapping totes of two random picklists can comprise randomly picking an index number for a first random tote and picking an index number for a second random tote. In many embodiments, a randomly picked index number can have a maximum value of a maximum number of totes. In various embodiments, an index number for a first random tote and an index number for a second random tote are both assigned to totes in a random picklist. In these embodiments, a two-way swap can be performed. In the same or different embodiments, a two-way swap can comprise swapping a first random tote and a second random tote between their respective random picklists. In many embodiments, only one index number of the index numbers for the first random tote and the second random tote are assigned to a tote in a random picklist. In these embodiments, a one-way swap can be performed. In various embodiments, a one-way swap can comprise moving the tote from the random picklist to the other random picklist. In many embodiments, a cost savings can be determined between a random picklist having been swapped and a first random picklist, as selected above. In various embodiments, a cost savings can comprise a cost of a picklist after a swap minus a cost of a picklist prior to a swap. In embodiments where the cost savings is positive (e.g., when swapping would decrease a cost of at least one random picklist of two random picklists), the resulting picklists after the swap can be re-incorporated into the one or more picklists, and all or a portion of a randomized tote local search loop can be repeated. In embodiments wherein the cost savings is negative (e.g., when swapping would increase a cost of at least one random picklist of two random picklists), swaps can be undone and/or swapped picklists can be deleted, and at least a portion of a randomized tote local search loop can be repeated. In some embodiments where a cost savings is positive, resulting picklists the swap can be checked for one or more business conditions. In various embodiments, one or more business conditions can comprise a maximum volume capacity of a tote, a maximum weight capacity of a tote, and/or a maximum tote capacity of a trolley. In embodiments where a business condition is violated, swaps can be undone and/or swapped picklists can be deleted, and at least a portion of a randomized tote local search loop can be repeated. In these or other embodiments, a randomized tote local search loop can be repeated a predetermined number of iterations before terminating. In some embodiments, a predetermined number of iterations can be set by an administrator of system 300 (FIG. 3).

In many embodiments, method 700 can comprise an activity 707 of executing an update min trolley loop. In these or other embodiments, executing an update min trolley loop can comprise performing activities 708-709. In various embodiments, activities 708-709 can be performed without executing an update min trolley loop. In many embodiments, an update min trolley loop can comprise all or a part of a set of instructions embodied in pseudocode shown in FIG. 10.

Returning now to FIG. 7, in many embodiments, method 700 can comprise an activity 708 of selecting a shortest picklist of one or more picklists. In some embodiments, one or more picklists can comprise at least one picklist as swapped by at least a portion of a randomized tote local search loop. In various embodiments, a randomized tote local search loop can comprise a greedy algorithm. In these or other embodiments, a shortest picklist can comprise a last picklist leftover after performing a one-way swap as described in activity 706. In many embodiments, a number of totes in a shortest picklist can be compared to a maximum number of totes. In embodiments where a number of totes in a shortest picklist is equal to a maximum number of totes, an update min trolley loop can be terminated. In some embodiments, activity 404 (FIG. 4) can be performed after an update min trolley loop is terminated by displaying a number of totes of a shortest picklist and a remainder of one or more picklists on a store computer 360 (FIG. 3) as part of a picklist. In embodiments where a number of totes in a shortest picklist is less than a maximum number of totes, one or more best totes of one or more remaining totes can be determined. In some embodiments, one or more best totes can be determined by executing an add totes to min trolley loop. In some embodiments, an add totes to min trolley loop can comprise executing a local search. In these or other embodiments, executing a randomized tote local search loop can comprise performing activity 709. In various embodiments, activity 709 can be performed without executing an add totes to min trolley loop. In many embodiments, an add totes to min trolley loop can comprise all or a part of a set of instructions embodied in pseudocode shown in FIG. 11

Returning now to FIG. 7, in many embodiments, method 700 can comprise an activity 709 of combining a shortest picklist with at least one picklist when the combining would save a cost. In some embodiments, a cost savings can be determined by subtracting a cost of picklists pre-merger (a sum of a cost of all totes in a picklist) with cost of picklists post-merger. In many embodiments, a tote with a highest savings can be selected, and the tote with the highest savings can be removed from its picklist and added to a shortest picklist to create a combination picklist. In various embodiments, an add totes to min trolley loop can be repeated until no more savings can be found and/or the combination picklist reaches a maximum number of totes.

In many embodiments, method 700 can comprise an activity 710 of facilitating displaying a combination picklist to a picker. In many embodiments, a combination picklist can be displayed with one or more other picklists created and/or used in method 700. In some embodiments, activity 710 can be performed as a part of and/or in addition to activity 404 (FIG. 4). In these or other embodiments, activity 710 can be performed without activity 404 (FIG. 4). In many embodiments, facilitating displaying a combination picklist to a picker can comprise displaying a number of totes on a store computer 360 (FIG. 3) as part of a picklist.

Figure 12:
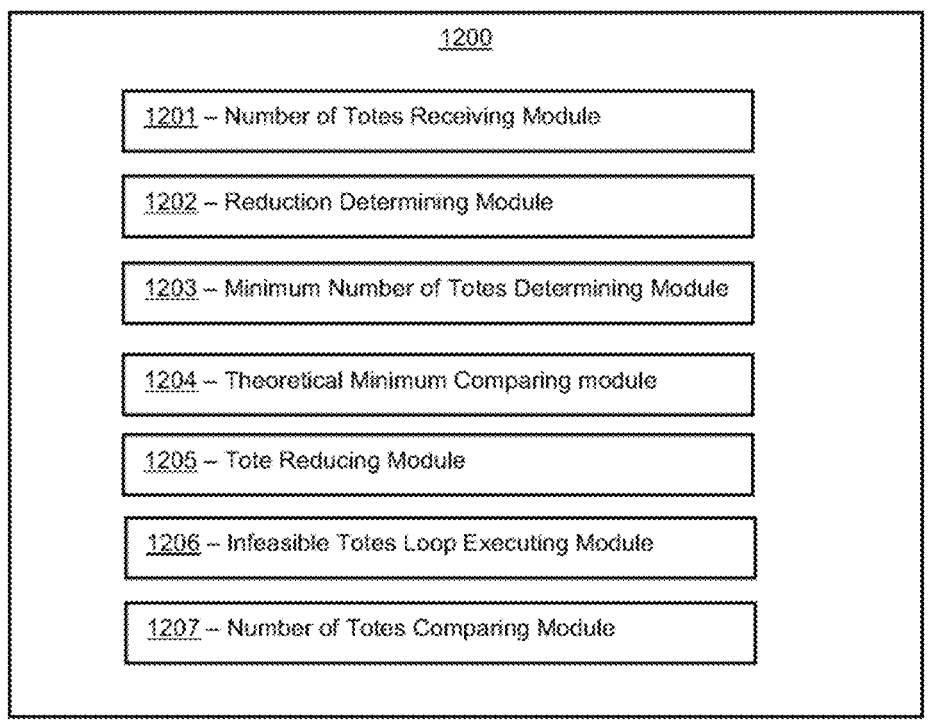
FIG. 12 illustrates a representative block diagram of a system, according to an additional embodiment.

Turning ahead in the drawings, FIG. 12 illustrates a block diagram of a system 1200 that can be employed for behavior based messaging. System 1200 is merely exemplary and embodiments of the system are not limited to the embodiments presented herein. System 1200 can be employed in many different embodiments or examples not specifically depicted or described herein. In some embodiments, certain elements or modules of system 1200 can perform various procedures, processes, and/or activities. In these or other embodiments, the procedures, processes, and/or activities can be performed by other suitable elements or modules of system 1200.

Generally, therefore, system 1200 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 1200 described herein.

In many embodiments, system 1200 can comprise non-transitory memory storage module 1201. Memory storage module 1201 can be referred to as number of totes receiving module 1201. In many embodiments, number of totes receiving module 1201 can store computing instructions configured to run on one or more processing modules and perform one or more acts of method 500 (FIG. 5) (e.g., activity 501 (FIG. 5)).

In many embodiments, system 1200 can comprise non-transitory memory storage module 1202. Memory storage module 1202 can be referred to as reduction determining module 1202. In many embodiments, reduction determining module 1202 can store computing instructions configured to run on one or more processing modules and perform one or more acts of method 500 (FIG. 5) (e.g., activity 502 (FIG. 5)).

In many embodiments, system 1200 can comprise non-transitory memory storage module 1203. Memory storage module 1203 can be referred to as minimum number of totes determining module 1203. In many embodiments, minimum number of totes determining module 1203 can store computing instructions configured to run on one or more processing modules and perform one or more acts of method 500 (FIG. 5) (e.g., activity 503 (FIG. 5)).

In many embodiments, system 1200 can comprise non-transitory memory storage module 1204. Memory storage module 1204 can be referred to as theoretical minimum comparing module 1204. In many embodiments, theoretical minimum comparing module 1204 can store computing instructions configured to run on one or more processing modules and perform one or more acts of method 500 (FIG. 5) (e.g., activity 505 (FIG. 5)).

In many embodiments, system 1200 can comprise non-transitory memory storage module 1205. Memory storage module 1205 can be referred to as tote reducing module 1205. In many embodiments, tote reducing module 1205 can store computing instructions configured to run on one or more processing modules and perform one or more acts of method 500 (FIG. 5) (e.g., activity 505 (FIG. 5)).

In many embodiments, system 1200 can comprise non-transitory memory storage module 1206. Memory storage module 1206 can be referred to as infeasible totes loop executing module 1206. In many embodiments, infeasible totes loop executing module 1206 can store computing instructions configured to run on one or more processing modules and perform one or more acts of method 500 (FIG. 5) (e.g., activity 506 (FIG. 5)).

In many embodiments, system 1200 can comprise non-transitory memory storage module 1207. Memory storage module 1207 can be referred to as number of totes comparing module 1207. In many embodiments, number of totes comparing module 1207 can store computing instructions configured to run on one or more processing modules and perform one or more acts of method 500 (FIG. 5) (e.g., activity 507 (FIG. 5)).

Figure 13:
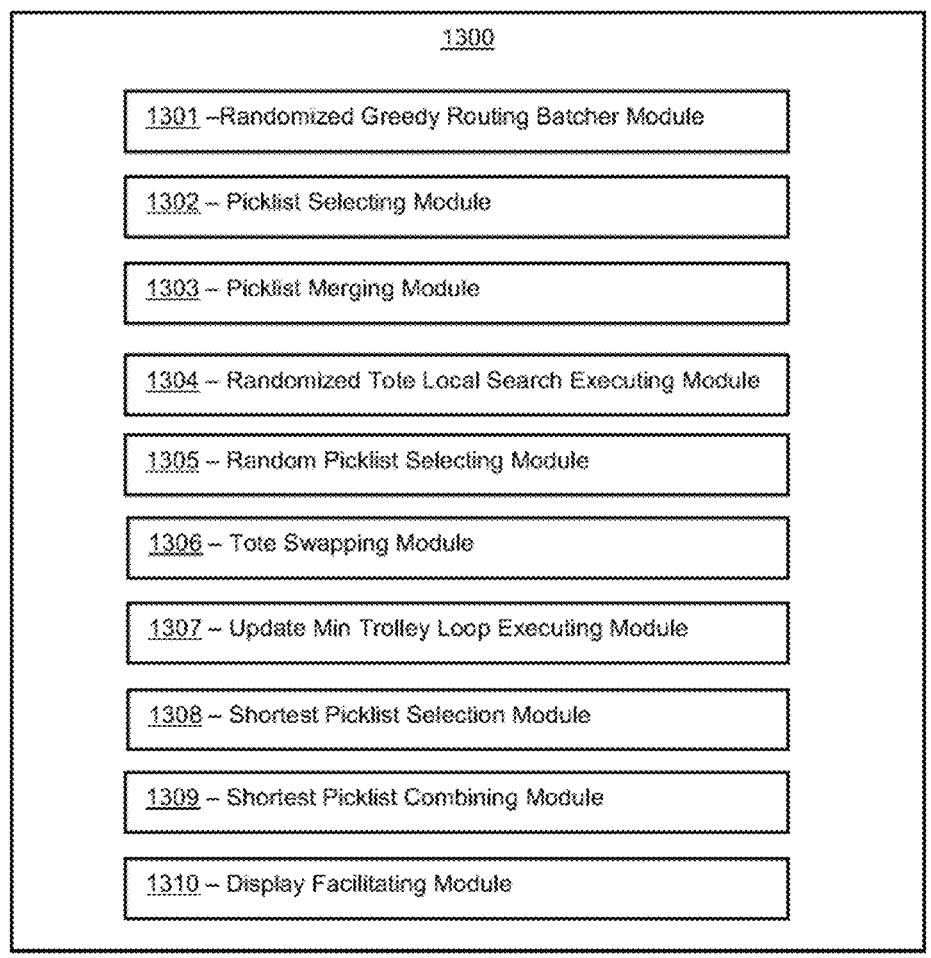
FIG. 13 illustrates a representative block diagram of a system, according to an additional embodiment.

Turning ahead in the drawings, FIG. 13 illustrates a block diagram of a system 1300 that can be employed for behavior based messaging. System 1300 is merely exemplary and embodiments of the system are not limited to the embodiments presented herein. System 1300 can be employed in many different embodiments or examples not specifically depicted or described herein. In some embodiments, certain elements or modules of system 1300 can perform various procedures, processes, and/or activities. In these or other embodiments, the procedures, processes, and/or activities can be performed by other suitable elements or modules of system 1300.

Generally, therefore, system 1300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 1300 described herein.

In many embodiments, system 1300 can comprise non-transitory memory storage module 1301. Memory storage module 1301 can be referred to as randomized greedy incremental batcher module 1301. In many embodiments, randomized greedy incremental batcher module 1301 can store computing instructions configured to run on one or more processing modules and perform one or more acts of method 700 (FIG. 7) (e.g., activity 701 (FIG. 7)).

In many embodiments, system 1300 can comprise non-transitory memory storage module 1302. Memory storage module 1302 can be referred to as picklist selecting module 1302. In many embodiments, picklist selecting module 1302 can store computing instructions configured to run on one or more processing modules and perform one or more acts of method 700 (FIG. 7) (e.g., activity 702 (FIG. 7)).

In many embodiments, system 1300 can comprise non-transitory memory storage module 1303. Memory storage module 1303 can be referred to as picklist merging module 1303. In many embodiments, picklist merging module 1303 can store computing instructions configured to run on one or more processing modules and perform one or more acts of method 700 (FIG. 7) (e.g., activity 703 (FIG. 7)).

In many embodiments, system 1300 can comprise non-transitory memory storage module 1304. Memory storage module 1304 can be referred to as randomized tote local search executing module 1304. In many embodiments, randomized tote local search executing module 1304 can store computing instructions configured to run on one or more processing modules and perform one or more acts of method 700 (FIG. 7) (e.g., activity 704 (FIG. 7)).

In many embodiments, system 1300 can comprise non-transitory memory storage module 1305. Memory storage module 1305 can be referred to as random picklist selecting module 1305. In many embodiments, random picklist selecting module 1305 can store computing instructions configured to run on one or more processing modules and perform one or more acts of method 700 (FIG. 7) (e.g., activity 705 (FIG. 7)).

In many embodiments, system 1300 can comprise non-transitory memory storage module 1306. Memory storage module 1306 can be referred to as tote swapping module 1306. In many embodiments, tote swapping module 1306 can store computing instructions configured to run on one or more processing modules and perform one or more acts of method 700 (FIG. 7) (e.g., activity 706 (FIG. 7)).

In many embodiments, system 1300 can comprise non-transitory memory storage module 1307. Memory storage module 1307 can be referred to as update min trolley loop executing module 1307. In many embodiments, update min trolley loop executing module 1307 can store computing instructions configured to run on one or more processing modules and perform one or more acts of method 700 (FIG. 7) (e.g., activity 707 (FIG. 7)).

In many embodiments, system 1300 can comprise non-transitory memory storage module 1308. Memory storage module 1308 can be referred to as shortest picklist selection module 1308. In many embodiments, shortest picklist selection module 1308 can store computing instructions configured to run on one or more processing modules and perform one or more acts of method 700 (FIG. 7) (e.g., activity 708 (FIG. 7)).

In many embodiments, system 1300 can comprise non-transitory memory storage module 1309. Memory storage module 1309 can be referred to as shortest picklist combining module 1309. In many embodiments, shortest picklist combining module 1309 can store computing instructions configured to run on one or more processing modules and perform one or more acts of method 700 (FIG. 7) (e.g., activity 709 (FIG. 7)).

In many embodiments, system 1300 can comprise non-transitory memory storage module 1310. Memory storage module 1310 can be referred to as display facilitating module 1310. In many embodiments, display facilitating module 1310 can store computing instructions configured to run on one or more processing modules and perform one or more acts of method 700 (FIG. 7) (e.g., activity 710 (FIG. 7)).

Figure 14:
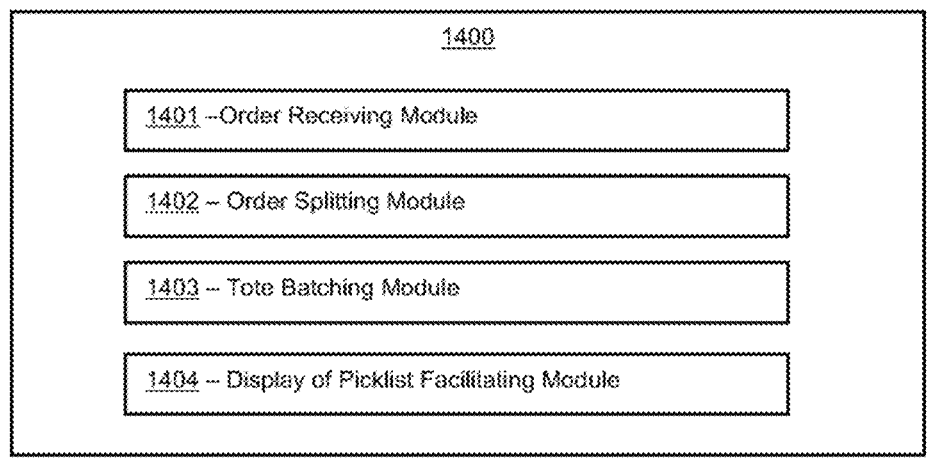
FIG. 14 illustrates a representative block diagram of a system, according to an additional embodiment.

Turning ahead in the drawings, FIG. 14 illustrates a block diagram of a system 1400 that can be employed for behavior based messaging. System 1400 is merely exemplary and embodiments of the system are not limited to the embodiments presented herein. System 1400 can be employed in many different embodiments or examples not specifically depicted or described herein. In some embodiments, certain elements or modules of system 1400 can perform various procedures, processes, and/or activities. In these or other embodiments, the procedures, processes, and/or activities can be performed by other suitable elements or modules of system 1400.

Generally, therefore, system 1400 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 1400 described herein.

In many embodiments, system 1400 can comprise non-transitory memory storage module 1401. Memory storage module 1401 can be referred to as order receiving module 1401. In many embodiments, order receiving module 1401 can store computing instructions configured to run on one or more processing modules and perform one or more acts of method 400 (FIG. 4) (e.g., activity 401 (FIG. 4)).

In many embodiments, system 1400 can comprise non-transitory memory storage module 1402. Memory storage module 1402 can be referred to as order splitting module 1402. In many embodiments, order splitting module 1402 can store computing instructions configured to run on one or more processing modules and perform one or more acts of method 400 (FIG. 4) (e.g., activity 402 (FIG. 4)).

In many embodiments, system 1400 can comprise non-transitory memory storage module 1403. Memory storage module 1403 can be referred to as tote batching module 1403. In many embodiments, tote batching module 1403 can store computing instructions configured to run on one or more processing modules and perform one or more acts of method 400 (FIG. 4) (e.g., activity 403 (FIG. 4)).

In many embodiments, system 1400 can comprise non-transitory memory storage module 1404. Memory storage module 1404 can be referred to as display of picklist facilitating module 1404. In many embodiments, display of picklist facilitating module 1404 can store computing instructions configured to run on one or more processing modules and perform one or more acts of method 400 (FIG. 4) (e.g., activity 404 (FIG. 4)).

Although systems and methods for optimization of pick walks have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-12 may be modified, and that the foregoing discussion of certain of these embodiments does not necessarily represent a complete description of all possible embodiments. For example, one or more of the procedures, processes, or activities of FIGS. 4, 5, and/or 7 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions that, when executed on the one or more processors, cause the one or more processors to perform functions comprising:
receiving a respective number of totes for each respective order of one or more orders, wherein the totes are to be filled by a picker according to a picklist as part of a pick walk along a path in a store, and wherein the path is configured to allow the picker to fill the totes for a respective order of the one or more orders by at least pulling one or more carts loaded with the totes travelling around the store on the path;
determining, using a first set of rules, when the respective number of the totes for the respective order of the one or more orders can be reduced;
when the respective number of the totes is determined to be able to be reduced, reducing, using a second set of rules, the respective number of the totes for the respective order to a respective reduced number of the totes for the respective order of the one or more orders, wherein the second set of rules comprises an infeasible totes loop;

executing, as part of the infeasible totes loop, a large scale neighborhood search comprising an item exhaustive search that determines all possible combinations of items swapped between the respective number of the totes for the respective order, wherein the item exhaustive search further runs until a maximum number of iterations is reached;

comparing the respective number of the totes for the respective order to the respective reduced number of the totes for the respective order;

when the respective number of the totes for the respective order is compared to be equal to the respective reduced number of the totes for the respective order, facilitating displaying, on an electronic device carried by the picker, the respective number of the totes for the respective order, wherein the respective number of the totes for the respective order is returned from a previous iteration of the maximum number of the iterations reached, and wherein the respective number of the totes for the respective order comprises the picklist;

generating directions for a route of the pick walk based on a map of the store, wherein the route is overlaid on the map of the store; and displaying the map of the store for the pick walk on the electronic device carried by the picker, wherein the map comprises the directions for the pick walk for the picklist, and wherein the directions further comprise turn by turn directions of the route displayed on the map of the picklist.

2. The system of claim 1, wherein determining, using the first set of rules, when the respective number of the totes for the respective order of the one or more orders can be reduced comprises:

determining, using the first set of rules, a theoretical minimum number of the totes for the respective order;

comparing the theoretical minimum number of the totes for the respective order with the respective number of the totes; and when the theoretical minimum number of the totes for the respective order is less than the respective number of the totes, determining that the respective number of the totes can be reduced.

3. The system of claim 2, wherein the first set of rules comprise:

calculating a respective total volume for items in the respective order; and dividing the respective total volume for the items in the respective order by a maximum volume capacity for each tote to determine the theoretical minimum number of the totes for the respective order.

4. The system of claim 2, wherein the first set of rules comprise:

calculating a respective total weight for items in the respective order; and dividing the respective total weight for the items in the respective order by a maximum weight capacity for each tote to determine the theoretical minimum number of the totes for the respective order.

5. The system of claim 1, wherein the second set of rules comprise:

creating one or more infeasible totes using items in the respective number of the totes for the respective order;

determining, using a third set of rules and a respective infeasible tote ratio for the one or more infeasible totes, when a first respective item of the items in a first respective tote of the respective number of the totes for the respective order cannot be swapped with a second respective item of the items in a second respective tote of the respective number of the totes for the respective order; and when the first respective item in the first respective tote for the respective order cannot be swapped with the second respective item in the second respective tote for the respective order, increasing a minimum number of the totes for the respective order by one tote.

6. The system of claim 5, wherein the third set of rules further comprise:

determining a savings metric of each swap of the items between the respective number of the totes using two or more infeasible tote ratios, wherein the savings metric comprises subtracting a first sum of respective infeasible tote ratios of two new totes from a second sum of respective infeasible tote ratios of two original totes; and when all swaps of the items create a negative saving metric, terminating the infeasible totes loop.

7. The system of claim 5, wherein the computing instructions, when executed on the one or more processors, further cause the one or more processors to perform functions comprising:

repeating (1) determining when the first respective item in the first respective tote for the respective order cannot be swapped with the second respective item in the second respective tote for the respective order and (2) increasing the minimum number of the totes for the respective order until the first respective item in the first respective tote for the respective order can be swapped with the second respective item in the second respective tote for the respective order; and when the first respective item in the first respective tote for the respective order can be swapped with the second respective item in the second respective tote for the respective order, setting the respective reduced number of the totes for the respective order as a current number of the totes for the respective order.

8. The system of claim 1, wherein the second set of rules comprise:

executing a greedy tote reduction algorithm using a maximum volume capacity of each tote of the totes for the respective order.

9. The system of claim 1, wherein the second set of rules comprise:

executing a greedy tote reduction algorithm using a maximum weight capacity of each tote of the totes for the respective order.

10. The system of claim 1, wherein the computing instructions, when executed on the one or more processors, further cause the one or more processors to perform functions comprising:

when the respective number of the totes for the respective order is compared to be not equal to the respective reduced number of the totes for the respective order:

reducing, using the second set of rules, the respective reduced number of the totes for the respective order to a respective further reduced number of the totes for the respective order of the one or more orders;

comparing the respective reduced number of the totes for the respective order to the respective further reduced number of the totes for the respective order; and when the respective reduced number of the totes for the respective order is equal to the respective further reduced number of the totes for the respective order, facilitating displaying, on the electronic device carried by the picker, the respective reduced number of the totes for the respective order.

11. A method being implemented via execution of computing instructions configured to run on one or more processors stored one or more non-transitory computer-readable media, the method comprising:

receiving a respective number of totes for each respective order of one or more orders, wherein the totes are to be filled by a picker according to a picklist as part of a pick walk along a path in a store, and wherein the path is configured to allow the picker to fill the totes for a respective order of the one or more orders by at least pulling one or more carts loaded with the totes travelling around the store on the path;

determining, using a first set of rules, when the respective number of the totes for the respective order of the one or more orders can be reduced;

when the respective number of the totes is determined to be able to be reduced, reducing, using a second set of rules, the respective number of the totes for the respective order to a respective reduced number of the totes for the respective order of the one or more orders, wherein the second set of rules comprises an infeasible totes loop;

executing, as part of the infeasible totes loop, a large scale neighborhood search comprising an item exhaustive search that determines all possible combinations of items swapped between the respective number of the totes for the respective order, wherein the item exhaustive search further runs until a maximum number of iterations is reached;

comparing the respective number of the totes for the respective order to the respective reduced number of the totes for the respective order;

when the respective number of the totes for the respective order is compared to be equal to the respective reduced number of the totes for the respective order, facilitating displaying, on an electronic device carried by the picker, the respective number of the totes for the respective order, wherein the respective number of the totes for the respective order is returned from a previous iteration of the maximum number of the iterations reached, and wherein the respective number of the totes for the respective order comprises the picklist;

generating directions for a route of the pick walk based on a map of the store, wherein the route is overlaid on the map of the store; and displaying the map of the store for the pick walk on the electronic device carried by the picker, wherein the map comprises the directions for the pick walk for the picklist, and wherein the directions further comprise turn by turn directions of the route displayed on the map of the picklist.

12. The method of claim 11, wherein determining, using the first set of rules, when the respective number of the totes for the respective order of the one or more orders can be reduced comprises:

determining, using the first set of rules, a theoretical minimum number of the totes for the respective order;

comparing the theoretical minimum number of the totes for the respective order with the respective number of the totes; and when the theoretical minimum number of the totes for the respective order is less than the respective number of the totes, determining that the respective number of the totes can be reduced.

13. The method of claim 12, wherein the first set of rules comprise:

calculating a respective total volume for items in the respective order; and dividing the respective total volume for the items in the respective order by a maximum volume capacity for each tote to determine the theoretical minimum number of the totes for the respective order.

14. The method of claim 12, wherein the first set of rules comprise:

calculating a respective total weight for items in the respective order; and dividing the respective total weight for the items in the respective order by a maximum weight capacity for each tote to determine the theoretical minimum number of the totes for the respective order.

15. The method of claim 11, wherein the second set of rules comprise:

creating one or more infeasible totes using items in the respective number of the totes for the respective order;

determining, using a third set of rules and a respective infeasible tote ratio for the one or more infeasible totes, when a first respective item of the items in a first respective tote of the respective number of the totes for the respective order cannot be swapped with a second respective item of the items in a second respective tote of the respective number of the totes for the respective order; and when the first respective item in the first respective tote for the respective order cannot be swapped with the second respective item in the second respective tote for the respective order, increasing a minimum number of the totes for the respective order by one tote.

16. The method of claim 15, wherein the third set of rules further comprise:

determining a savings metric of each swap of the items between the respective number of the totes using two or more infeasible tote ratios, wherein the savings metric comprises subtracting a first sum of respective infeasible tote ratios of two new totes from a second sum of respective infeasible tote ratios of two original totes; and when all swaps of the items create a negative saving metric, terminating the infeasible totes loop.

17. The method of claim 15, wherein the method further comprises:

repeating (1) determining when the first respective item in the first respective tote for the respective order cannot be swapped with the second respective item in the second respective tote for the respective order and (2) increasing the minimum number of the totes for the respective order until the first respective item in the first respective tote for the respective order can be swapped with the second respective item in the second respective tote for the respective order; and when the first respective item in the first respective tote for the respective order can be swapped with the second respective item in the second respective tote for the respective order, setting the respective reduced number of the totes for the respective order as a current number of the totes for the respective order.

18. The method of claim 11, wherein the second set of rules comprise:
   executing a greedy tote reduction algorithm using a maximum volume capacity of each tote of the totes for the respective order.

19. The method of claim 11, wherein the second set of rules comprise:
   executing a greedy tote reduction algorithm using a maximum weight capacity of each tote of the totes for the respective order.

20. The method of claim 11, wherein the method further comprises:
   when the respective number of the totes for the respective order is compared to be not equal to the respective reduced number of the totes for the respective order:
      reducing, using the second set of rules, the respective reduced number of the totes for the respective order to a respective further reduced number of the totes for the respective order of the one or more orders;
      comparing the respective reduced number of the totes for the respective order to the respective further reduced number of the totes for the respective order; and
   when the respective reduced number of the totes for the respective order is equal to the respective further reduced number of the totes for the respective order, facilitating displaying, on the electronic device carried by the picker, the respective reduced number of the totes for the respective order.

* * * * *